(12) United States Patent  
Horimoto et al.

(10) Patent No.: US 8,396,521 B2
(45) Date of Patent: Mar. 12, 2013

(54) ANTENNA COVER AND OPERATING SECTION FOR PORTABLE TERMINAL DEVICE

(75) Inventors: Hiroki Horimoto, Tokyo (JP); Ryo Tsuchiya, Tokyo (JP); Ryota Matsumoto, Tokyo (JP); Nobuhiro Oguma, Saitama (JP)

(73) Assignee: Sony Corporation, Tokyo (JP)

( * ) Notice: Subject to any disclaimer, the term of this patent is extended or adjusted under 35 U.S.C. 154(b) by 267 days.

(21) Appl. No.: 12/614,055

(22) Filed: Nov. 6, 2009

(65) Prior Publication Data

US 2010/0137043 A1 Jun. 3, 2010

(30) Foreign Application Priority Data

Dec. 3, 2008 (JP) ................................. 2008-308971

(51) Int. Cl.
*H04M 1/00* (2006.01)
(52) U.S. Cl. ................... 455/575.7; 455/575.1
(58) Field of Classification Search ............... 455/550.1, 455/90.3, 575.5, 556.1–556.2, 562.1, 575.1–575.8
See application file for complete search history.

(56) References Cited

U.S. PATENT DOCUMENTS

| | | | | |
|---|---|---|---|---|
| 6,163,302 A * | 12/2000 | Bjorkengren et al. | ........ | 343/702 |
| 6,404,403 B1 * | 6/2002 | Kunz et al. | ..................... | 343/841 |
| 6,944,433 B2 * | 9/2005 | Ogino | ........................ | 455/277.1 |
| 7,286,089 B2 * | 10/2007 | Lee et al. | ....................... | 343/702 |
| 7,801,568 B2 * | 9/2010 | Kim et al. | ...................... | 455/566 |
| 7,876,274 B2 * | 1/2011 | Hobson et al. | ................ | 343/702 |
| 7,925,316 B2 * | 4/2011 | Hongo et al. | .............. | 455/575.3 |
| 8,000,736 B2 * | 8/2011 | Forstall et al. | ............. | 455/550.1 |
| 8,090,130 B2 * | 1/2012 | Zorkendorfer et al. | ........ | 381/334 |
| 2001/0041545 A1 * | 11/2001 | Liberman et al. | ............. | 455/117 |
| 2004/0224733 A1 * | 11/2004 | Kim | ........................... | 455/575.7 |
| 2005/0090299 A1 * | 4/2005 | Tsao et al. | .................. | 455/575.5 |
| 2006/0099837 A1 * | 5/2006 | Cheng et al. | ................... | 439/131 |
| 2006/0160585 A1 * | 7/2006 | Miyagawa et al. | ......... | 455/575.7 |
| 2007/0213103 A1 | 9/2007 | Zaitsu | | |
| 2007/0265028 A1 * | 11/2007 | Jorgensen | ................ | 455/550.1 |
| 2008/0060926 A1 * | 3/2008 | Zadesky et al. | ............... | 200/341 |
| 2008/0074329 A1 * | 3/2008 | Caballero et al. | ............ | 343/702 |
| 2010/0075695 A1 * | 3/2010 | Haughay et al. | ........... | 455/456.1 |
| 2010/0103145 A1 * | 4/2010 | Terai | ............................. | 345/184 |

FOREIGN PATENT DOCUMENTS

| | | |
|---|---|---|
| JP | 2002-258981 | 9/2002 |
| JP | 2007-67744 | 3/2007 |
| JP | 2008-35115 | 2/2008 |

OTHER PUBLICATIONS

Office Action issued Jul. 24, 2012 in Japanese Application No. 2008-308971.

* cited by examiner

*Primary Examiner* — Brandon Miller
(74) *Attorney, Agent, or Firm* — Oblon, Spivak, McClelland, Maier & Neustadt, L.L.P.

(57) ABSTRACT

Disclosed herein is a portable terminal device including an antenna, a casing, and an operation unit. The casing at least part of which is formed from a metallic material is disposed so that the antenna is exposed. The operation unit is formed from a resin material and mounted to the casing so as to cover the exposed antenna.

9 Claims, 24 Drawing Sheets

ANTENNA COVER AND OPERATING SECTION FOR PORTABLE TERMINAL DEVICE

BACKGROUND OF THE INVENTION

1. Field of the Invention

The present invention relates to the technical field associated with portable terminal devices. More particularly, the invention relates to the technical field for contriving enhanced communication performance while securing sufficient rigidity of a casing of a portable terminal device by a configuration in which an operation unit formed from a resin material is disposed at a position, for covering an antenna, of a casing having a metallic casing body.

2. Description of the Related Art

Portable terminal devices include not only those which permit reproduction, viewing and listening, etc. of contents such as music and pictures but also those which enables information processing and the like, such as PDAs (personal digital assistants) and mobile phones.

Further, such portable terminal devices include those which have an antenna for permitting transmission and reception of information and, hence, have communication functions.

The portable terminal devices having communication functions may be classified into the type in which an antenna is drawn out to the exterior when used and the type in which an antenna is incorporated in a casing. In the type in which an antenna is incorporated in the casing, the antenna is mounted on a circuit board disposed inside the casing (see, for example, Japanese Patent Laid-Open No. 2007-67744).

SUMMARY OF THE INVENTION

Meanwhile, the casing in which required portions are disposed as above is desirably formed from a metallic material being high in rigidity and excellent in thermal conductivity, for the purposes of protecting the portions disposed therein and enhancing the performance of releasing to the exterior the heat generated inside. In the case of a portable device, particularly, external forces are liable to be exerted on the device due to dropping, vibration or the like. In this case, therefore, the need to form the casing from a metallic material higher in rigidity than resin materials is high.

In a portable terminal device of the type in which the antenna is incorporated in the casing as above-mentioned, however, the arrangement of the antenna inside the casing formed from a metallic material results in that the communication sensitivity of the antenna is lowered by the metallic material, possibly leading to a lowering in the communication performance of the device.

Thus, there is a desire to enhance communication performance of a portable terminal device while securing sufficient rigidity of a casing of the device and solving the above-described problems.

According to an embodiment of the present invention, there is provided a portable terminal device including: an antenna; a casing at least part of which is formed from a metallic material, the casing disposed so that the antenna is exposed; and an operation unit formed from a resin material, the operation unit mounted to the casing so as to cover the exposed antenna.

Thus, in this portable terminal device, at least part of the casing is formed from a metallic material, and the antenna is covered with the operation unit formed from a resin material. This promises an enhanced communication performance while securing sufficient rigidity of the casing.

In the portable terminal device, preferably, a display panel operable to display an image is disposed at a predetermined surface of the casing, a holding knob which, by being operated through sliding, is operable to hold a condition where execution of various functions can be effected or a condition where execution of various functions cannot be effected is provided as the operating section, and the holding knob is provided at a surface, on the opposite side from the surface where the display panel is disposed, of the casing.

Since the holding knob is provided at the surface, on the opposite side from the surface where the display panel is disposed, of the casing, the finger used to grip the portable terminal device is located on the surface opposite from the surface where the display panel is disposed. Therefore, in the condition where the display panel faces toward the user's side, the holding knob can be easily operated by the finger with which the portable terminal device is gripped. As a result, enhanced operability can be realized.

In the portable terminal device, preferably, a support base operable to slidably support the operating section is provided as part of the operation unit, the operating section is slidable relative to the support base between a first operating position and a second operating position, and the operation unit includes a click spring operable to selectively hold the operating section in the first operating position or the second operating position, the click spring formed from a resin material.

Since the click spring which selectively holds the operating section in the first operating position or the second operating position and which is formed from a resin material is provided, the operating section can be held in the first operating position or the second operating position by the click spring which would not cause a lowering in the sensitivity of the antenna. Therefore, a good communication performance can be secured while enhancing operability so as to realize enhanced convenience in use of the portable terminal device.

In the portable terminal device, preferably, the click spring is formed as one body with the support base.

Forming the click spring as one body with the support base leads to a reduced number of component parts, which promises a lowering in the manufacturing cost of the portable terminal device.

In the portable terminal device, preferably, the operating section is formed in a substantially semicircular shape.

With the operating section formed in a substantially semicircular shape, the force exerted on the operating section from the finger at the time of operation is liable to act in the direction of line of connection between a central portion of the semicircular shape and the finger. This enables smooth operation of the operating section.

The portable terminal device, preferably, further includes a plurality of operating means each formed from a resin material, the operating means disposed at positions such as to cover the antenna.

The arrangement of the plurality of operating means at such positions as to cover the antenna ensures that the operating means are collectively disposed in the vicinity of the operating section. As a result, enhanced operability can be realized.

In the portable terminal device, preferably, a replay button operable to effect replay of contents is provided as one of the operating means.

With the replay button for replay of contents provided as one of the operating means, a button which is used frequently is disposed as an operating means, whereby enhanced operability is promised.

BRIEF DESCRIPTION OF THE DRAWINGS

FIG. 5 is en enlarged exploded perspective view showing a metallic casing and the like;

FIG. 6 is an enlarged perspective view showing a first operation unit together with the metallic casing and the like;

FIG. 11 is an enlarged perspective view showing a second operation unit together with the metallic casing and the like;

DETAILED DESCRIPTION OF THE PREFERRED EMBODIMENT

Now, a best mode for carrying out a portable terminal device according to an embodiment of the present invention will be described below, referring to the accompanying drawings.

The best mode described below pertains to an application of the present invention to a portable terminal device permitting reproduction, viewing and listening, etc. of contents such as music and pictures. Incidentally, the range of application of the invention is not limited to such a portable terminal device. The invention is widely applicable to various portable terminal devices such as PDAs (Personal Digital Assistants) capable of information processing, and mobile phones, etc. having communication functions.

The portable terminal device described below is provided with a display panel. In the following description, the side on which the display panel is disposed is taken as the front side, in referring to any of the front, rear, upper, lower, left and right sides.

Incidentally, the front, rear, upper, lower, left and right sides in the following description are merely for convenience of description, and they are not limitative factors in carrying out the present invention.

[General Configuration]

Figure 1:
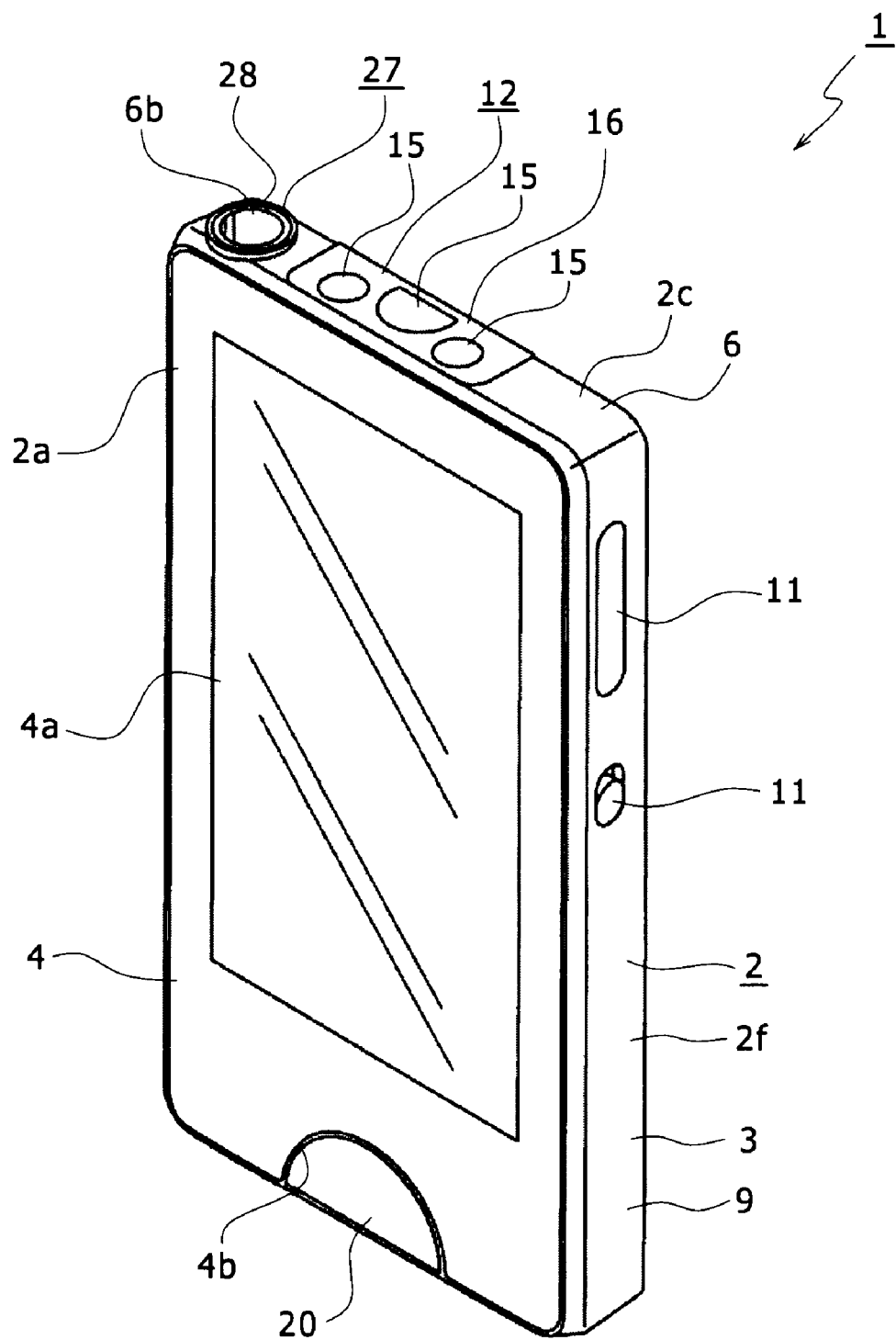
FIG. 1, which together with FIGS. 2 to 24 illustrates a best mode for carrying out the present invention, is a perspective view of a portable terminal device.
Figure 2:
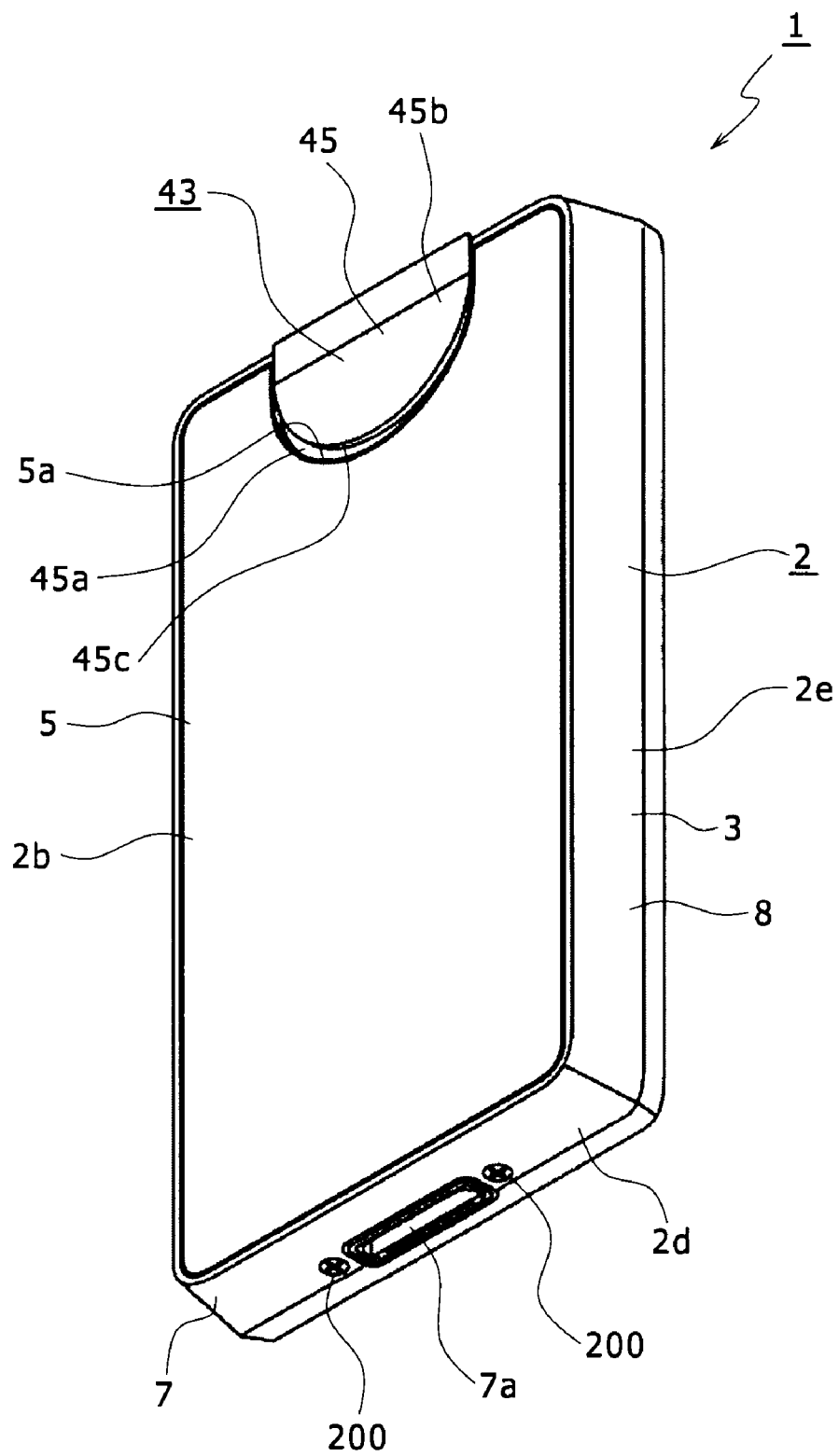
FIG. 2 is a perspective view of the portable terminal device, as viewed from a direction different from that of FIG. 1.

As shown in FIGS. 1 and 2, the portable terminal device 1 is formed for example in a substantially rectangular shape which is elongated vertically and is flat. The portable terminal device 1 has a casing 2, and required portions disposed inside the casing 2. Outer surfaces of the casing 2 includes a front surface 2a, a rear surface 2b, a top surface 2c, a bottom surface 2d, a left side surface 2e, and a right side surface 2f.

The casing 2 is composed of a frame-like metallic casing body 3, a flat plate-formed front panel 4 mounted to a front surface of the metallic casing body 3, and a flat plate-formed rear panel 5 mounted to a rear surface of the metallic casing body 3.

[Metallic Casing Body]

Figure 3:
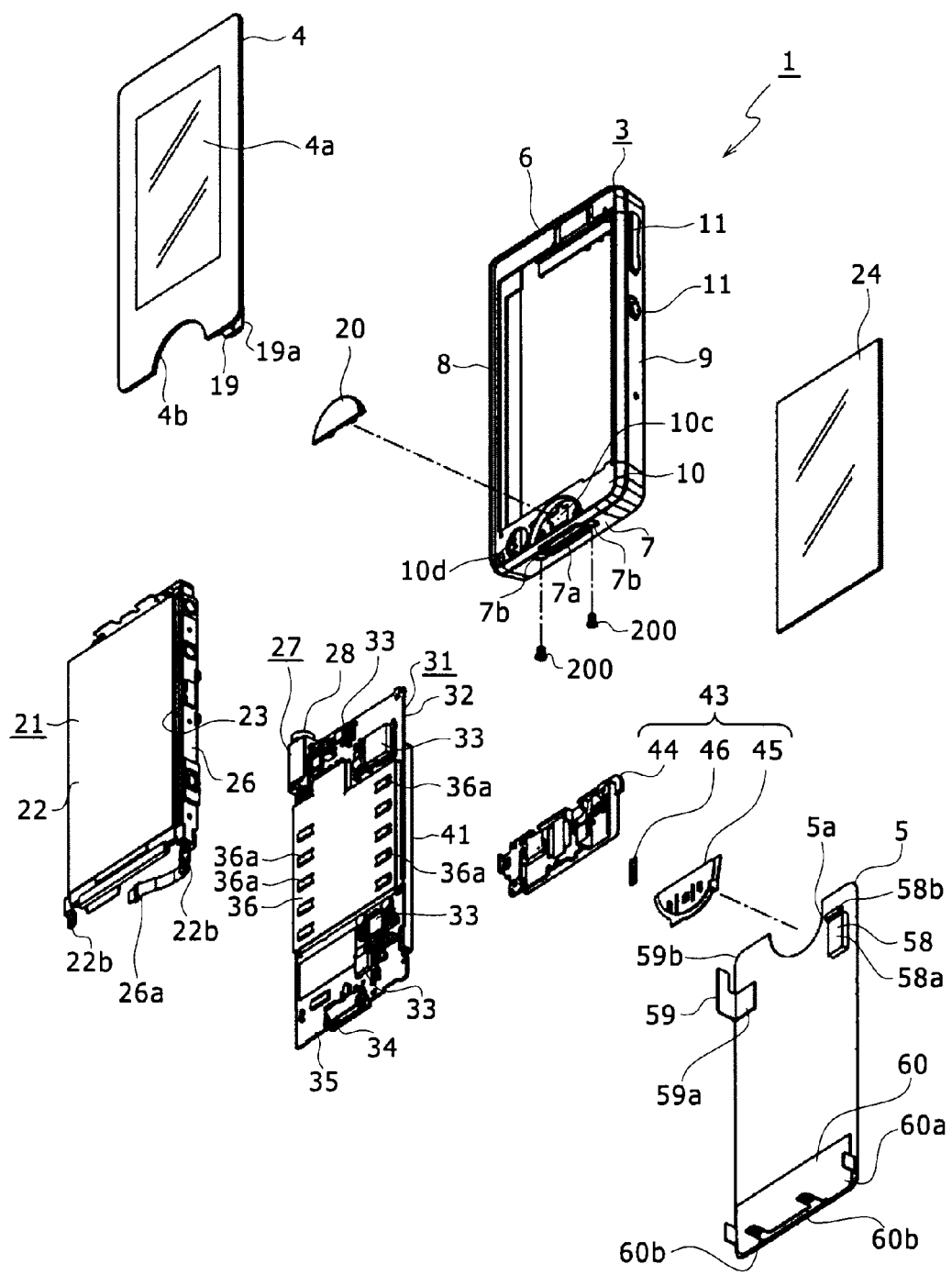
FIG. 3 is an exploded perspective view of the portable terminal device.
Figure 4:
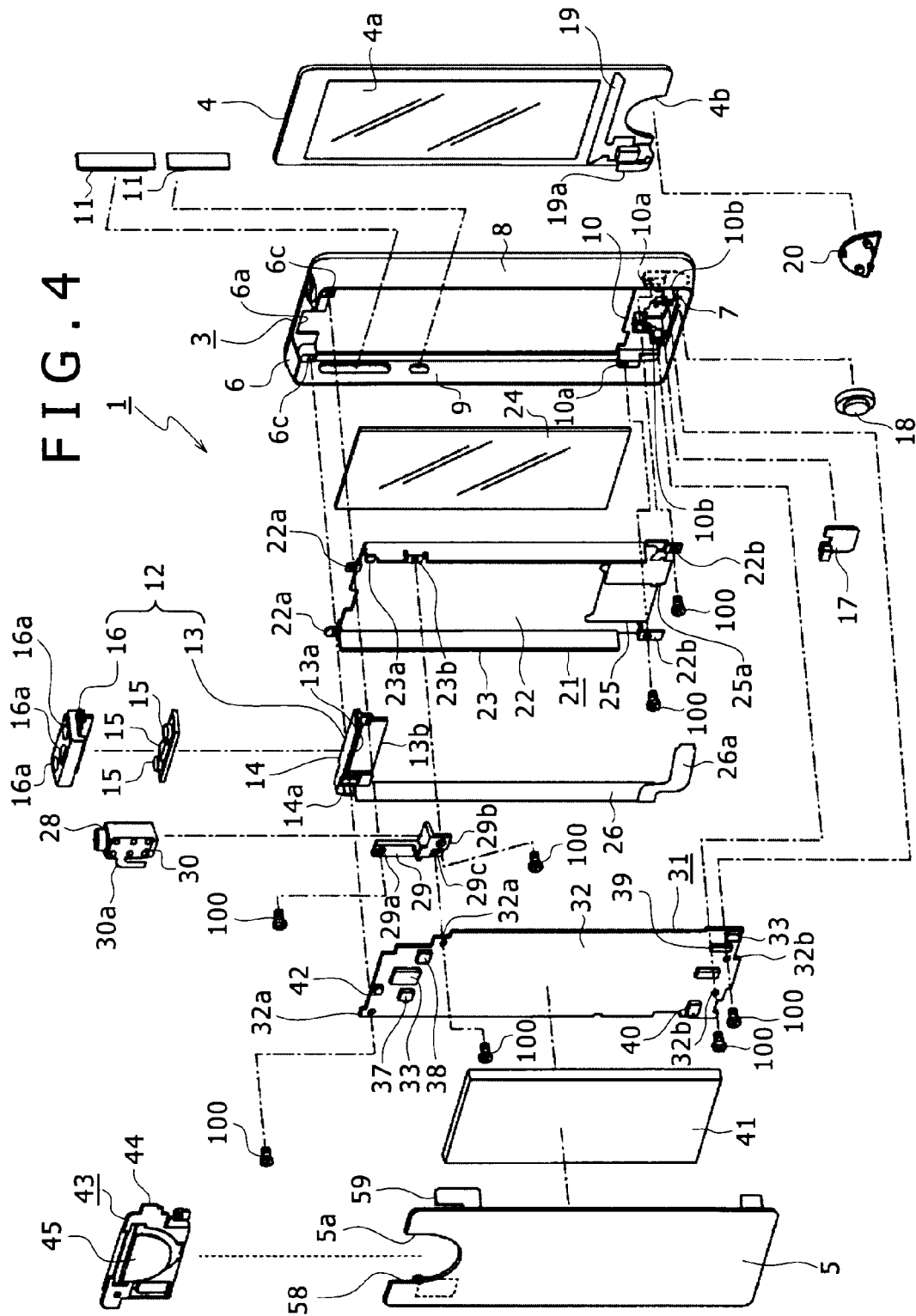
FIG. 4 is an exploded perspective view of the portable terminal device, as viewed from a direction different from that of FIG. 3.

As shown in FIGS. 3 and 4, the metallic casing body 3 is composed of a top surface portion 6, a bottom surface portion 7, a left side surface portion 8, a right side surface portion 9, and a mounting surface section 10. The mounting surface section 10 is oriented in the front-rear direction, and is provided to be continuous with respective front surfaces of the bottom surface portion 7, a bottom end portion of the left side surface portion 8, and a bottom end portion of the right side surface portion 9.

Figure 5:
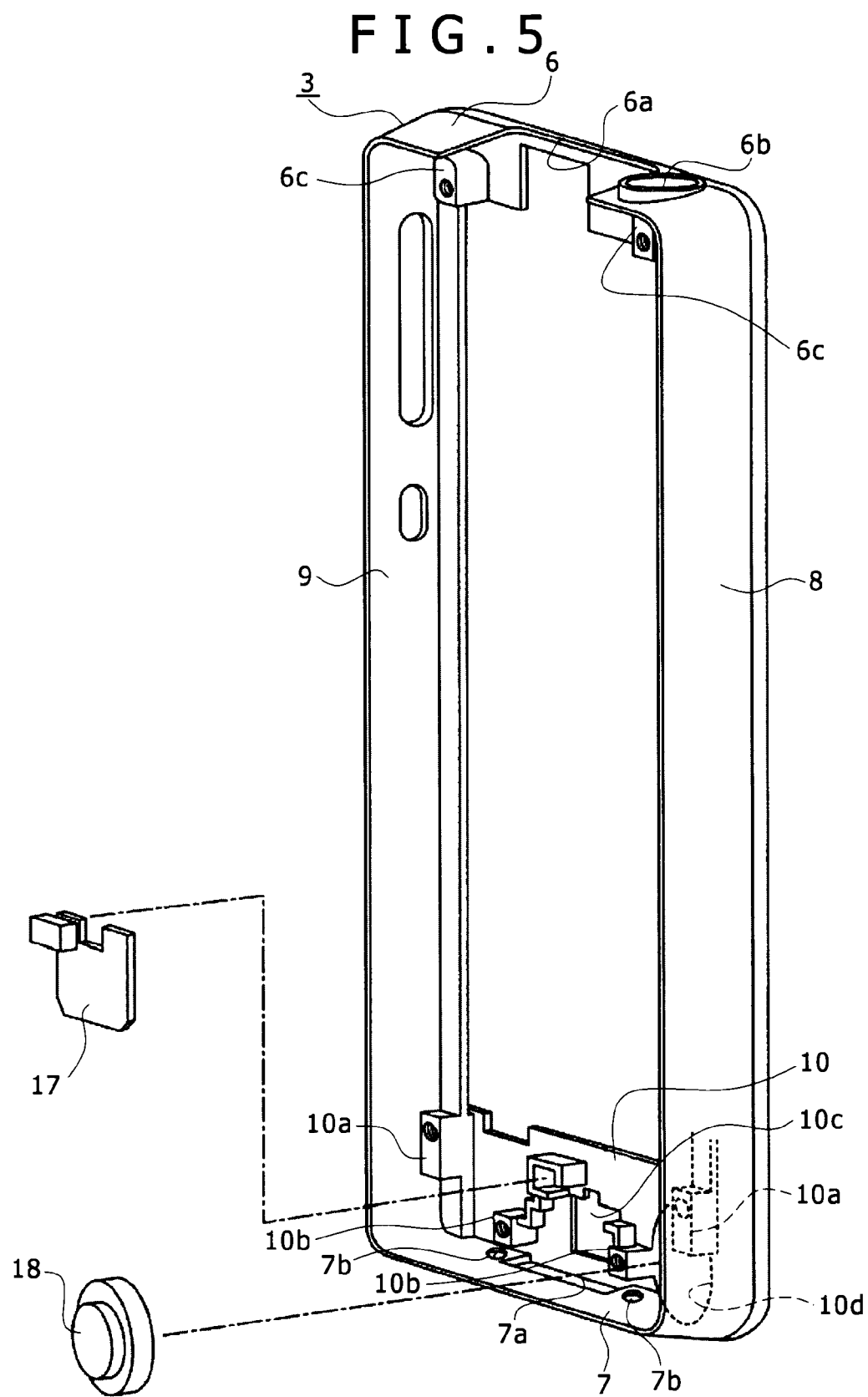

The top surface portion 6 is formed with an arranging cutout 6a opening to the rear side, in its portion exclusive of both its left and right end portions, and is formed with a terminal insertion hole 6b which penetrates its left end portion in the vertical direction (see FIG. 5). The terminal insertion hole 6b is a hole in which to insert a terminal of an earphone or headphone. At a front edge of the top surface portion 6, screwing pieces 6c, 6c projected downwards are provided to be spaced from each other in the left-right direction.

The bottom surface portion 7 is formed with a terminal insertion hole 7a in its central portion in the left-right direction, and is formed with screw insertion holes 7b, 7b on the left and right sides of the terminal insertion hole 7a. The terminal insertion hole 7a is a hole in which to insert a battery charging terminal.

At near-to-end positions of the right side surface portion 9, operating means 11, 11 are arranged to be vertically spaced from each other. The operating means 11, 11 are each an operating button, an operating knob, or an operating dial for effecting execution of a predetermined function when operated. As the operating means 11, 11, for example, a volume control and a noise function on-off switch are provided.

The mounting surface section 10 is provided on its rear surface with screwing portions 10a, 10a respectively at both its left and right end portions, and with screwing bosses 10b, 10b respectively at the inner side of the screwing portions 10a, 10a. The mounting surface section 10 is formed with an operating hole 10c in its central portion in the left-right direction, and is formed with a speaker arranging hole 10d on the left side of the operating hole 10c.

[First Operation Unit]

Figure 6:
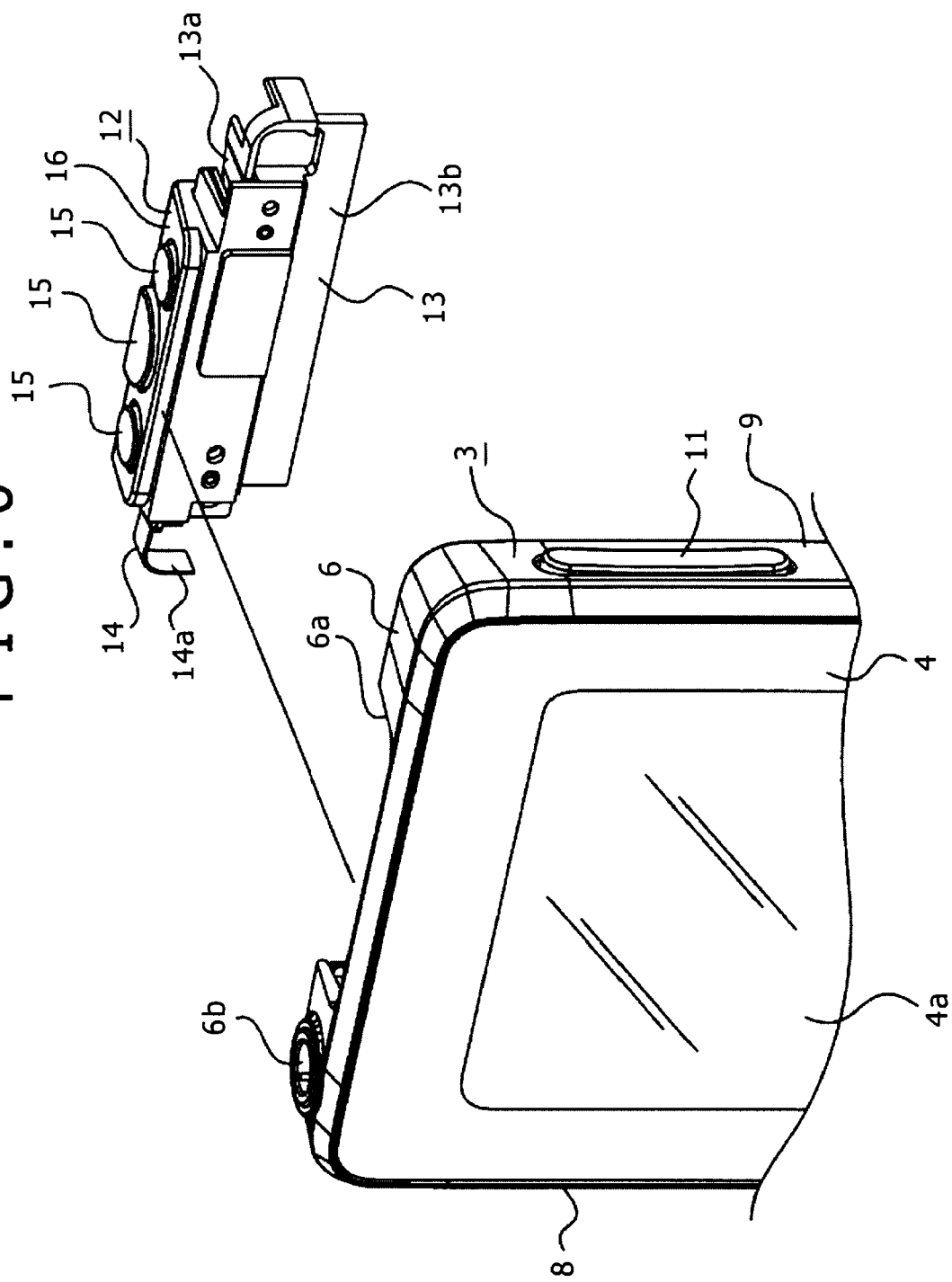

A first operation unit 12 is mounted to the top surface portion 6 in the state of being disposed in the arranging cutout 6a (see FIGS. 3, 4 and 6). The first operation unit 12 includes a base body 13 formed from a resin material, a first flexible printed wiring board 14 adhered to the base body 13, operating means 15, 15, 15 disposed on the first flexible printed wiring board 14, and a holder 16 for holding the operating means 15, 15, 15.

The base body 13 includes an adhering surface portion 13a oriented in the vertical direction and elongated in the left-right direction, and a mounted surface portion 13b projected downwards from the adhering surface portion 13a and oriented in the front-rear direction.

The first flexible printed wiring board 14, at its portion exclusive of its right end portion, is adhered to an upper surface of the adhering surface portion 13a of the base body 13. The right end portion of the first flexible printed wiring board 14 is provided as a connecting portion 14a, which is bent down.

The operating means 15, 15, 15 are linked in the state of being aligned side by side, and are disposed over the first flexible printed wiring board 14 adhered to the adhering surface portion 13a of the base body 13. The operating means 15, 15, 15 are each an operating button, an operating knob or an operating dial for effecting an execution of a predetermined function when operated. As the operating means 15, 15, 15, there are provided, for example, a replay button, a fast forward button, and a reverse button.

The holder 16 is formed with button arranging holes 16a, 16a, 16a spaced from one another in the left-right direction. The holder 16 is mounted to the base body 13, and is disposed in the arranging cutout 6a formed in the top surface portion 6 of the metallic casing body 3. In the condition where the holder 16 is mounted to the base body 13, the whole portion of the first flexible printed wiring board 14 except the connecting portion 14a is blocked with the holder 16, and the operating means 15, 15, 15 are inserted and disposed respectively in the button arranging holes 16a, 16a, 16a.

On the rear surface of the mounting surface section 10, a base plate 17 is mounted to a central portion in the left-right direction in the state of covering the operating hole 10c, and a speaker 18 is mounted to a left end portion in the state of covering the speaker arranging hole 10d.

[Front Panel]

The front panel 4 is formed, for example, from a glass material. As shown in FIGS. 1, 3 and 4, the front panel 4 is, at its portion other than its peripheral portion, formed as a touch panel section 4a made to be transparent, the remainder being opaque. The front panel 4 is formed in its lower end portion with a cutout portion 4b opening to the lower side. The cutout portion 4b has a substantially semicircular shape which is protuberant to the upper side. A second flexible printed circuit board 19 is adhered to a lower end portion of the rear surface of the front panel 4. The second flexible printed circuit board 19 is a circuit board for a touch panel, and is provided at its right end portion with a connecting portion 19a projected downwards.

The second flexible printed wiring board 19, at its portion other than the connecting portion 19a, is adhered to the rear surface of the front panel 4, and the connecting portion 19a is electrically connected to a circuit board which will be described later.

An operating button 20 is disposed at the lower end portion of the front panel 4 in the state of plugging up the cutout portion 4b. The operating button 20 has a substantially semicircular shape which is protuberant to the upper side. The operating button 20 is, for example, a home button for effecting display of an initial screen on a display panel (described later) when depressed. In this case, when the operating button 20 is depressed, a switch (not shown) provided on the base plate 17 is depressed through the operating hole 10c formed in the mounting surface section 10 of the metallic casing body 3, whereby a function of displaying the initial screen on the display panel is executed.

[Chassis]

A chassis 21 is disposed inside the casing 2. The chassis 21, which is formed by bending a sheet-formed metallic material into a predetermined shape, includes a base surface section 22 oriented in the front-rear direction, and side surface portions 23, 23 projected rearwards respectively from both left and right side edges of the base surface section 22.

Figure 7:
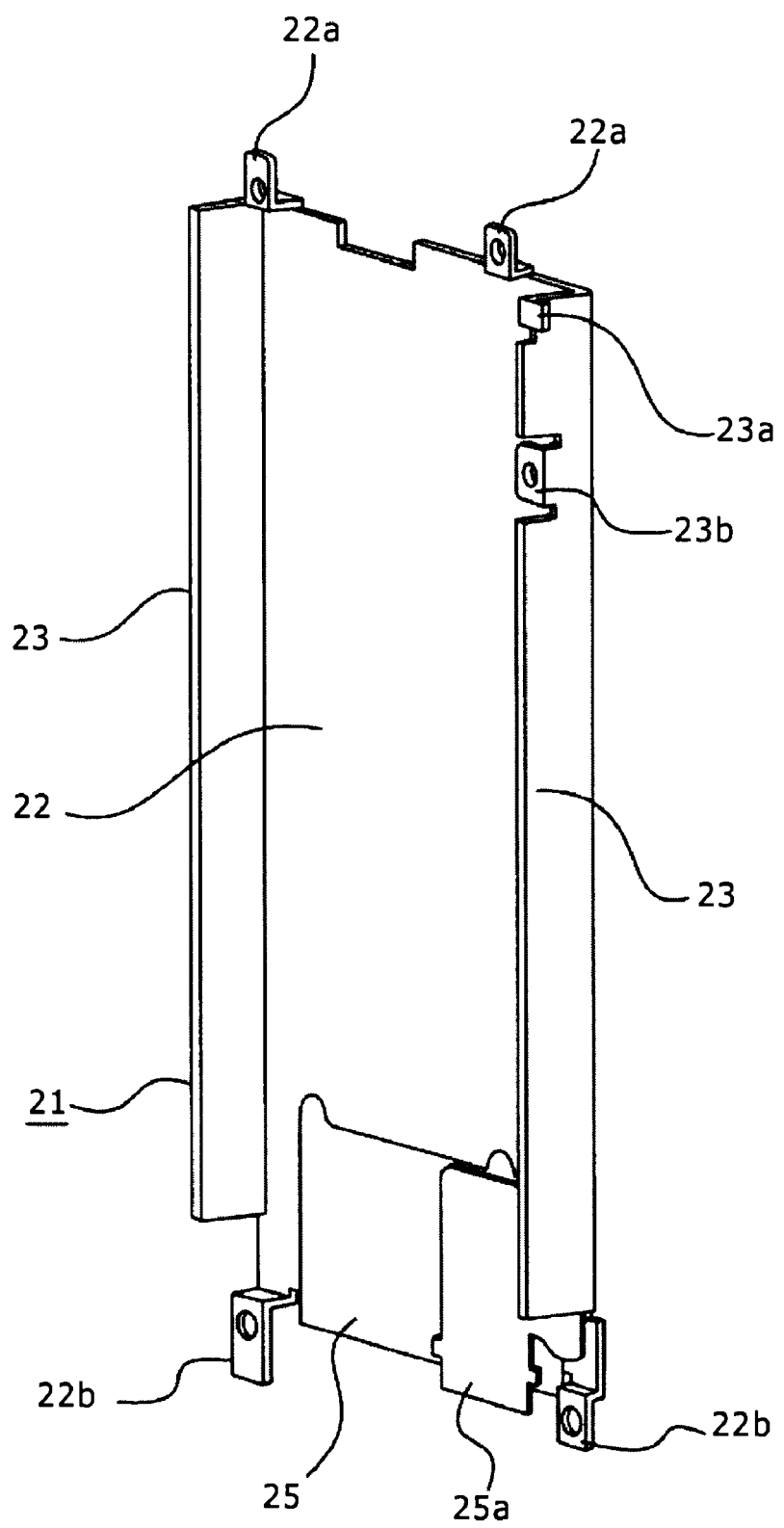
FIG. 7 is an enlarged perspective view of a chassis.

As shown in FIG. 7, the base surface section 22 is provided at its upper end portion with screwing pieces 22a, 22a projected upwards. The screwing pieces 22a, 22a are spaced from each other in the left-right direction. The base surface section 22 is provided at its lower end portion with screwing pieces 22b, 22b projected downwards respectively from both left and right end portions.

A display panel 24 is mounted to the front surface of the base surface section 22.

A third flexible printed wiring board 25 is adhered to a lower end portion of the rear surface of the base surface section 22. The third flexible printed wiring board 25 has a substantially rectangular shape which is elongated in the left-right direction, and its left end portion is provided as a connecting portion 25a. The third flexible printed wiring board 25 is adhered to the base surface section 22 at its portion other than the connecting portion 25a.

A fourth flexible printed wiring board 26 is adhered to the outer surface of the side surface portion 23 on the right side of the chassis 21. A lower end portion of the fourth flexible printed wiring board 26 is provided as a connecting portion 26a projected downwards from the side surface portion 23.

The side surface portion 23 on the left side of the chassis 21 is provided at its upper end portion with an engaging piece 23a projected leftwards, and is provided at its near-upper-end position with a mounting piece portion 23b projected rightwards.

The chassis 21 is mounted to the metallic casing body 3 in the state of being disposed on the rear side of the front panel 4 (see FIG. 4). The mounting of the chassis 21 to the metallic casing body 3 is carried out, for example, by a method in which mounting screws 100, 100, . . . are respectively passed through the screwing pieces 22a, 22a, 22b, 22b of the base surface section 22 and are screw-engaged with the screwing pieces 6c, 6c of the top surface portion 6 of the metallic casing 3 and the screwing portions 10a, 10a of the mounting surface section 10. Incidentally, the mounting screws 100, 100 passed through the screwing pieces 22a, 22a on the upper side serve also as mounting screws for mounting other members, such as a circuit board, to the metallic casing body 3 by co-fastening, as will be described later.

In the condition where the chassis 21 is mounted to the rear side of the front panel 4, the display panel 24 is in contact with or in proximity to the touch panel section 4a of the front panel 4.

Besides, in the condition where the chassis 21 is mounted to the rear side of the front panel 4, the other portion of the upper end portion of the base surface section 22 than the screwing pieces 22a, 22a on the upper side is disposed on the front side of the mounted surface portion 13b of the base body 13 in the first operation unit 12. In addition, the connecting portion 14a of the first flexible printed wiring board 14 in the first operation unit 12 is connected to an upper end portion of the fourth flexible printed wiring board 26.

[Earphone Unit]

As shown in FIG. 4, an earphone unit 27 is mounted to a left end portion of an inside upper end portion of the casing 2. The earphone unit 27 is composed of an earphone jack 28 formed in a substantially hollow cylindrical shape, a holding member 29 for holding the earphone jack 28, and a fifth flexible printed wiring board 30 adhered to a rear surface of the earphone jack 28.

Figure 8:
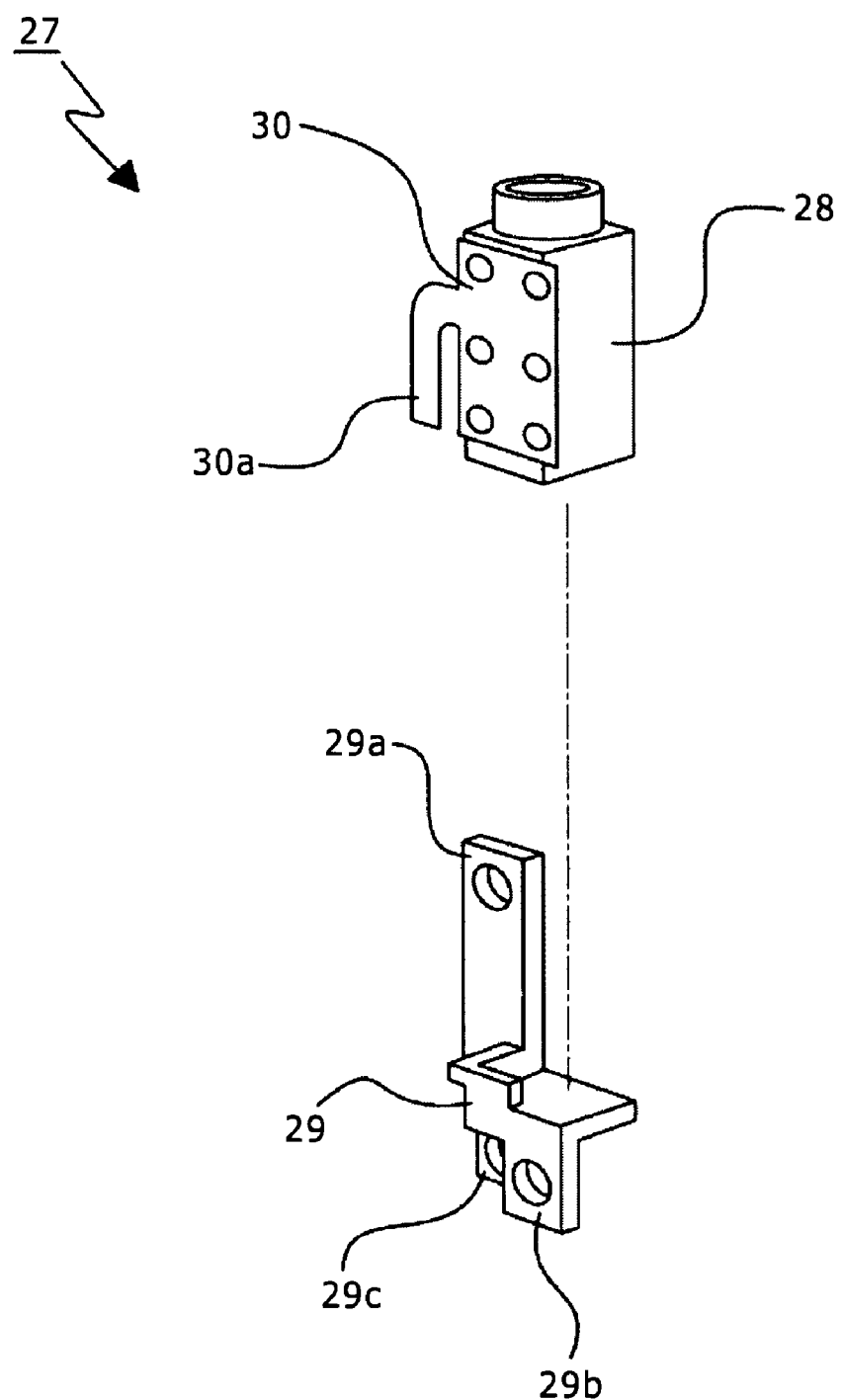
FIG. 8 is an enlarged exploded perspective view of an earphone unit.

As shown in FIG. 8, the holding member 29 is provided with screw inserting portions 29a, 29b respectively at both upper and lower end portions thereof, and is provided with a screwing portion 29c on a lateral side of the screw inserting portion 29b on the lower side.

The fifth flexible printed wiring board 30 has a connecting portion 30a projected downwards, and is adhered to the earphone jack 28 at its portion other than the connecting portion 30a.

In the condition where the earphone jack 28 of the earphone unit 27 is connected to the holding member 29, as shown in FIG. 4, the mounting screws 100, 100 are passed respectively through the screw inserting portions 29a, 29b, the mounting screw 100 on one side is passed through the screwing piece 22a of the chassis 21 and is screw-engaged with the screwing piece 6c of the metallic casing body 3, whereas the mounting screw 100 on the other side is screw-engaged with the mounting piece portion 23b of the chassis 21, whereby the earphone unit 27 is mounted to the metallic casing body 3 and the chassis 21. Incidentally, the mounting screw 100 on the one side is the mounting screw 100 which is passed through the screwing piece 22a of the chassis 21 and screw-engaged with the screwing piece 6c of the metallic casing body 3, and the holding member 29 and the chassis 21 are co-fastened to the metallic casing body 3 by this mounting screw 100.

[Circuit Board]

A circuit board 31 is mounted to the rear side of the base surface section 22 of the chassis 21 (see FIGS. 3 and 4). The circuit board 31 is formed in a vertically elongated form, wherein required component parts such as chip parts 33, 33, . . . are mounted on both the front and rear sides of a circuit board body 32.

Figure 9:
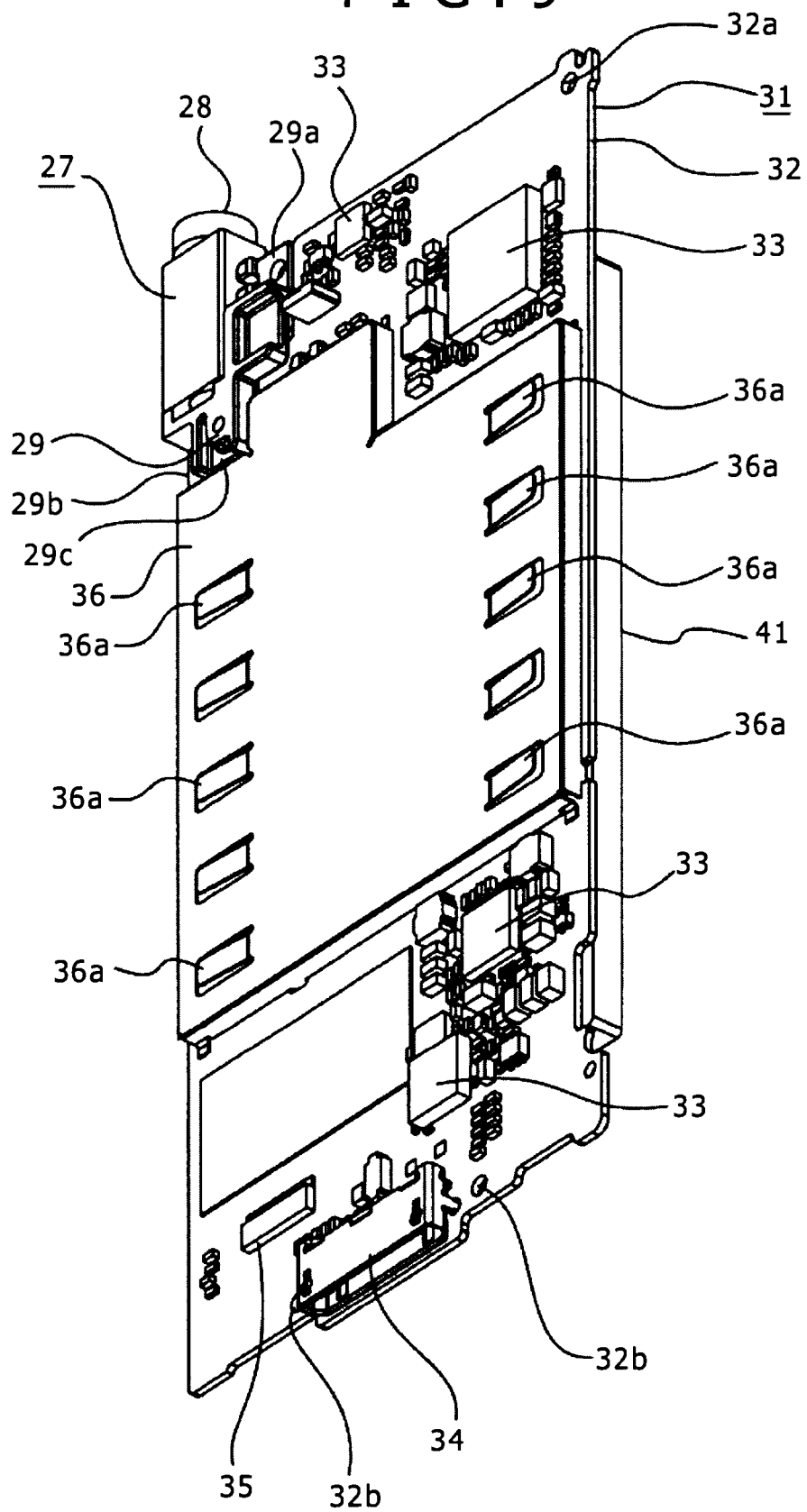
FIG. 9 is an enlarged perspective view of a circuit board.
Figure 10:
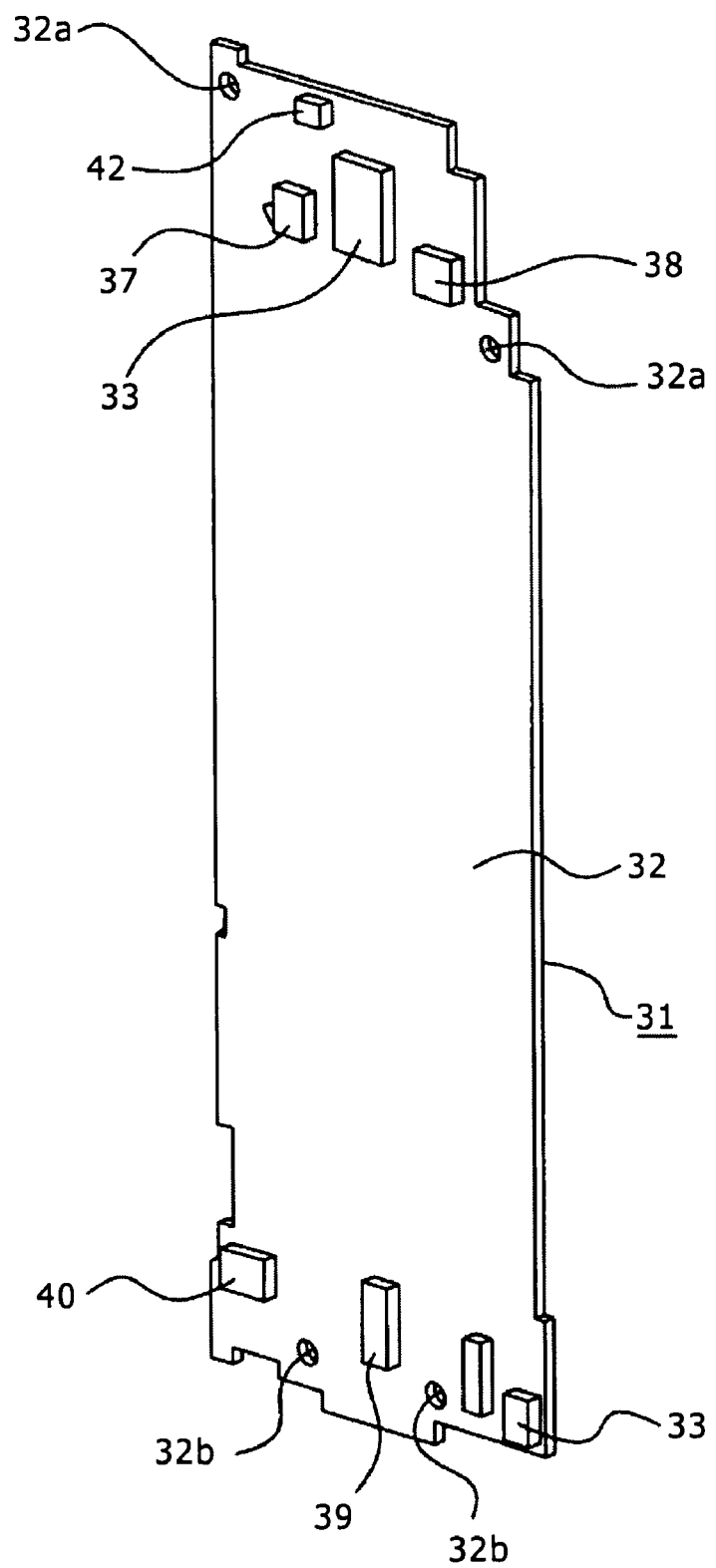
FIG. 10 is an enlarged perspective view of the circuit board, as viewed from a direction different from that of FIG. 9.

As shown in FIGS. 9 and 10, the circuit board body 32 is provided in its upper end portion and lower end portion with screw insertion holes 32a, 32a, 32b, 32b spaced from each other in the left-right direction.

On a front surface of the circuit board body 32, a connector 34 for battery charging is mounted in a lower end portion, and a connector 35 is mounted at a position near the lower end. To the front surface of the circuit board body 32, a presser plate 36 is mounted in an area other than both upper and lower end portions. A front surface of the presser plate 36 is located slightly on the front side relative to the front surface of the circuit board body 32. The presser plate 36 has tongue-formed presser leaf springs 36a, 36a, . . . at both left and right end portions of the front surface thereof. The presser leaf springs 36a, 36a, . . . are elastically deformable.

On the rear surface of the circuit board body 32, a switch 37 and a connector 38 are mounted at positions near the upper end. Besides, on the rear surface of the circuit board body 32, connectors 39 and 40 are mounted at near-lower-end positions spaced from each other in the left-right direction. Further, on the rear surface of the circuit board body 32, a thin-type storage battery 41 is mounted in an area other than both upper and lower end portions. The storage battery 41 is connected to a battery-charging terminal portion of the circuit board body 32.

On the rear side of the circuit board body 32, an antenna 42 is mounted in an upper end portion. The antenna 42 is, for example, an antenna for reception of one-seg broadcasting in ground-wave digital broadcasting.

As shown in FIG. 4, the circuit board 31 is mounted to the metallic casing body 3 and the like by the mounting screws 100, 100, . . . passed respectively through the screw insertion holes 32a, 32a, 32b, 32b. Specifically, the mounting screw 100 on one side which is passed through the insertion hole 32a is passed through the screwing piece 22a of the chassis 21 and screw-engaged with the screwing piece 6c of the metallic casing body 3, whereas the mounting screw 100 on the other side which is passed through the insertion hole 32a is screw-engaged with the screwing portion 29c of the holding member 29 in the earphone unit 27. In addition, the mounting screws 100, 100 passed through the insertion holes 32b, 32b are respectively screw-engaged with the screwing bosses 10b, 10b of the mounting surface section 10 in the metallic casing body 3. Therefore, the four mounting screws 100, 100, . . . are screw-engaged respectively with the screwing piece 6c of the metallic casing body 3, the screwing portion 29c of the earphone unit 27, and the screwing bosses 10b, 10b of the metallic casing body 3, whereby the circuit board 31 is mounted to the metallic casing 3 and the earphone unit 27.

Incidentally, the mounting screw 100 on the one side which is passed through the insertion hole 32a is the mounting screw 100 passed through the screwing piece 22a of the chassis 21 and screw-engaged with the screwing piece 6c of the metallic casing body 3, and the circuit board 31 and the chassis 21 are co-fastened to the metallic casing body 3 by this mounting screw 100.

In the condition where the circuit board 31 is mounted to the metallic casing body 3 and the like, the presser leaf springs 36a, 36a, . . . of the presser plate 36 are pressed against the rear surface of the base surface section 22 of the chassis 21. Therefore, by elastic forces exerted by the presser leaf springs 36a, 36a, . . . , the circuit board 31 is placed in a chatter-free stable state in relation to the base surface section 22 of the chassis 21.

In the condition where the circuit board 31 is mounted to the metallic casing body 3 and the like, the connecting portion 25a of the third flexible printed wiring board 25 adhered to the base surface section 22 of the chassis 21 is connected to the connector 35. Besides, the connecting portion 19a of the second flexible printed wiring board 19 adhered to the front panel 4 is connected to the connector 39. Further, the connecting portion 26a of the fourth flexible printed wiring board 26 adhered to the side surface portion 23 of the chassis 21 is connected to the connector 40. In addition, the connecting portion 30a of the fifth flexible printed wiring board 30 adhered to the earphone jack 28 of the earphone unit 27 is connected to the connector 38.

[Second Operation Unit]

Figure 11:
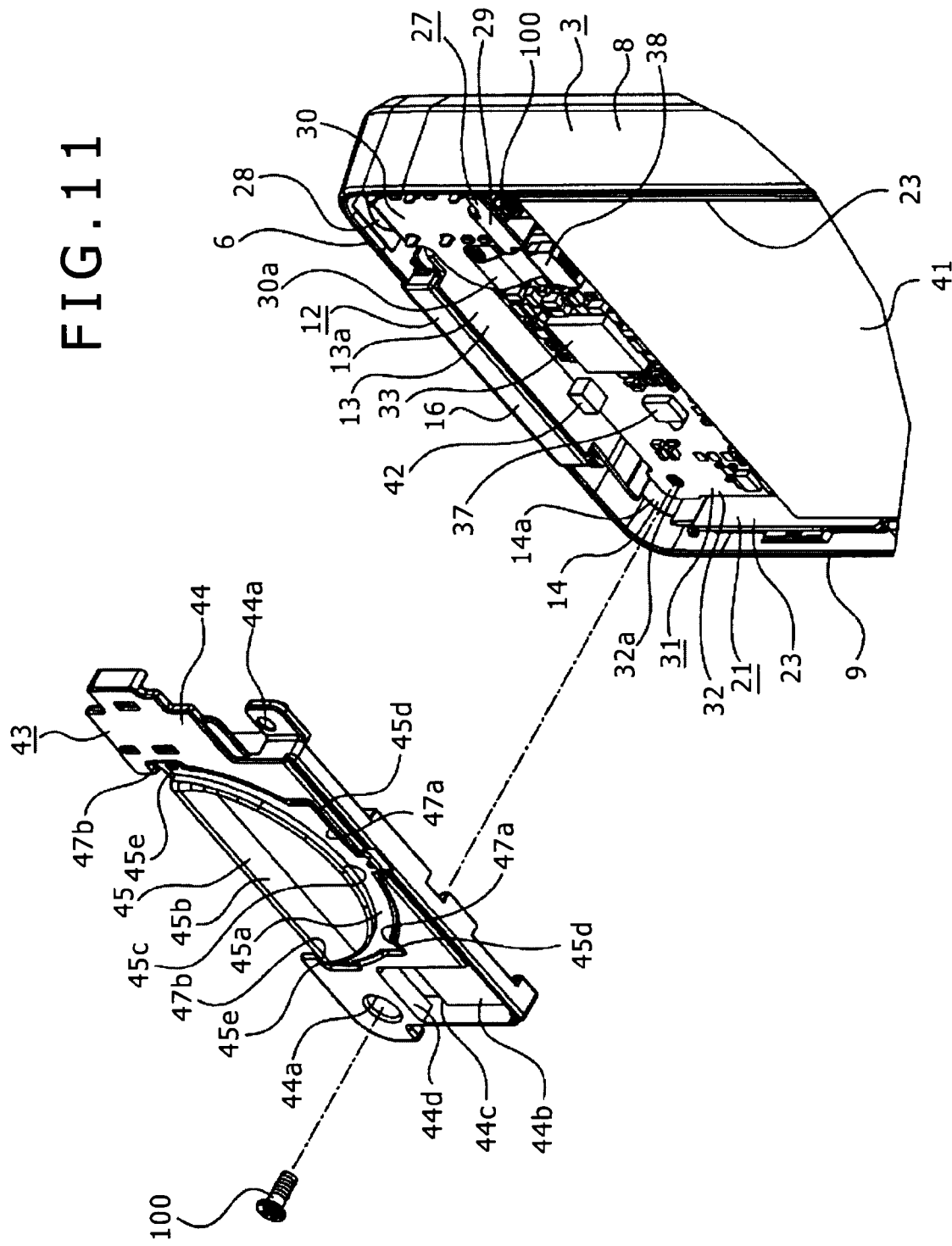
Figure 12:
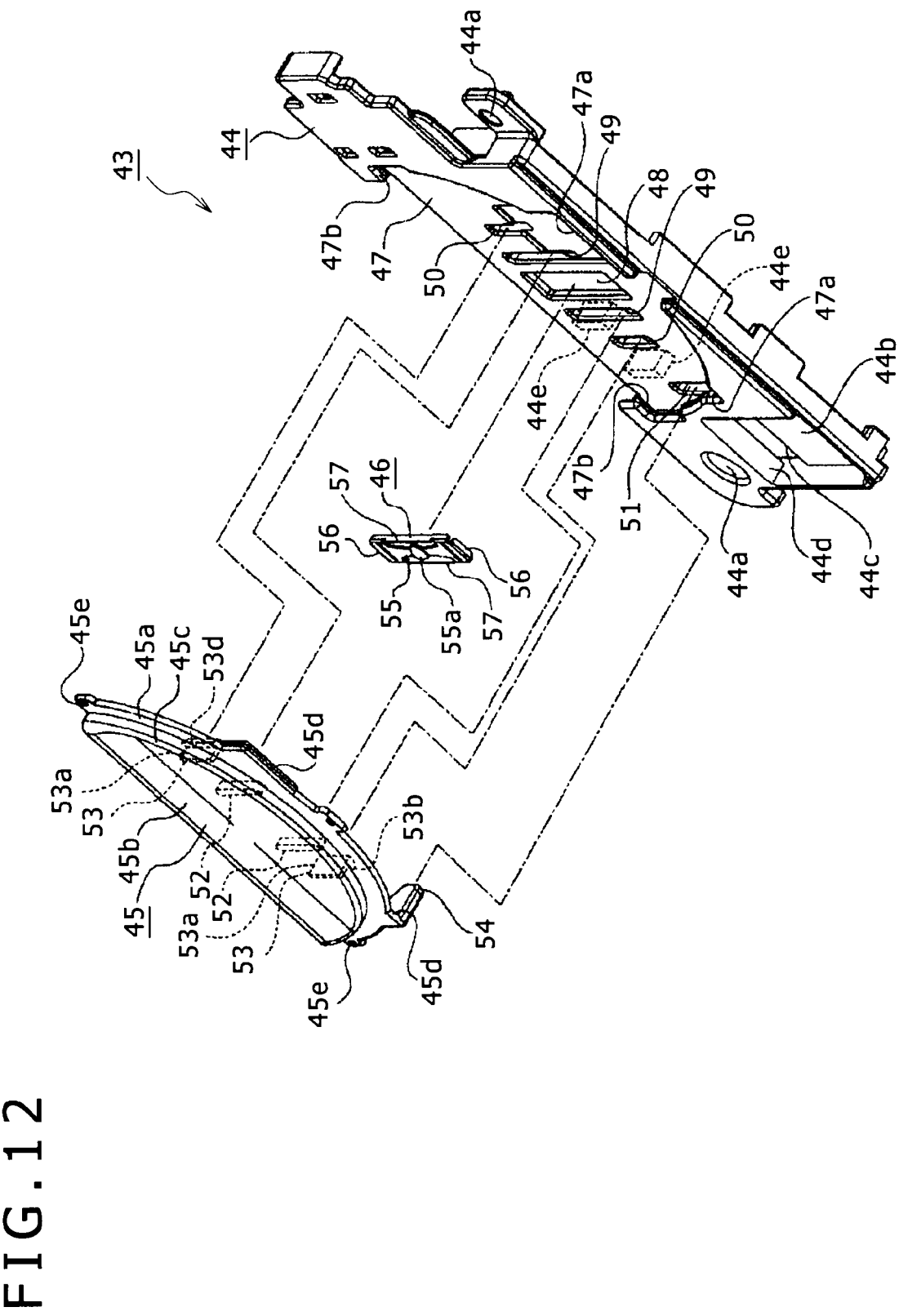
FIG. 12 is an enlarged exploded perspective view of the first operation unit.

A second operation unit 43 is mounted to the rear side of an upper end portion of the circuit board 31. As shown in FIGS. 11 and 12, the second operation unit 43 includes a support base 44 formed from a resin material, an operating section 45 formed from a resin material and slidably supported on the support base 44, and a click spring 46 formed from a resin material and mounted to the support base 44.

The support base 44 is formed in a thin, horizontally elongated, substantially rectangular shape, and is provided with screw insertion holes 44a, 44a respectively in a right end portion of an upper end portion thereof and in a left end portion of a lower end portion thereof.

The support base 44 is formed at a right end portion on the rear side thereof with a shallow engaging recess 44b opening to the rear and lower sides, and an insertion hole 44c penetrating the support base 44 is formed to be continuous with an upper end portion of the engaging recess 44b. A portion, on the upper side of the insertion hole 44c, of the support base 44 is provided as an engaging portion 44d. The support base 44 is provided at an upper end portion on the front side thereof with cover walls 44e, 44e which are spaced from each other in the left-right direction.

The support base 44 is provided in its rear surface with a shallow sliding recess 47 having a substantially semicircular shape protuberant to the lower side. The sliding recess 47 is provided at its lower edge with first stopper edges 47a, 47a which are spaced from each other in the left-right directions, and is provided at its upper edge with second stopper edges 47b, 47b which are spaced from each other in the left-right directions.

In addition, the sliding recess 47 is formed with a vertically elongated arranging recess 48 at its central portion in the left-right direction. Besides, the sliding recess 47 is formed with vertically extending guide grooves 49, 49 respectively on the left and right sides of the arranging recess 48, and with vertically extending support holes 50, 50 respectively on the outer side of the guide grooves 49, 49. Further, the sliding recess 47 is formed in its right end portion with a projected-portion insertion hole 51 which extends vertically.

The operating section 45 is, for example, a holding knob for holding a condition where various functions can be executed or a condition where various functions cannot be executed.

The operating section 45 is formed in a thin, substantially semicircular shape protuberant to the lower side, and its peripheral portion 45a exclusive of an upper end portion is formed to be thinner than the other portion. The other portion is provided as a thick portion 45b which is thicker than the peripheral portion 45a, and a stepped portion 45c extending in an arcuate shape is formed in a boundary area between the peripheral portion 45a and the thick portion 45b.

The operating section 45 is formed with first restricted edges 45d, 45d extending in the left-right direction, respectively at the lower edge and a near-left-end position of the peripheral portion 45a. Both left and right end portions of the upper edge of the operating section 45 are respectively formed as second restricted edges 45e, 45e.

Figure 13:
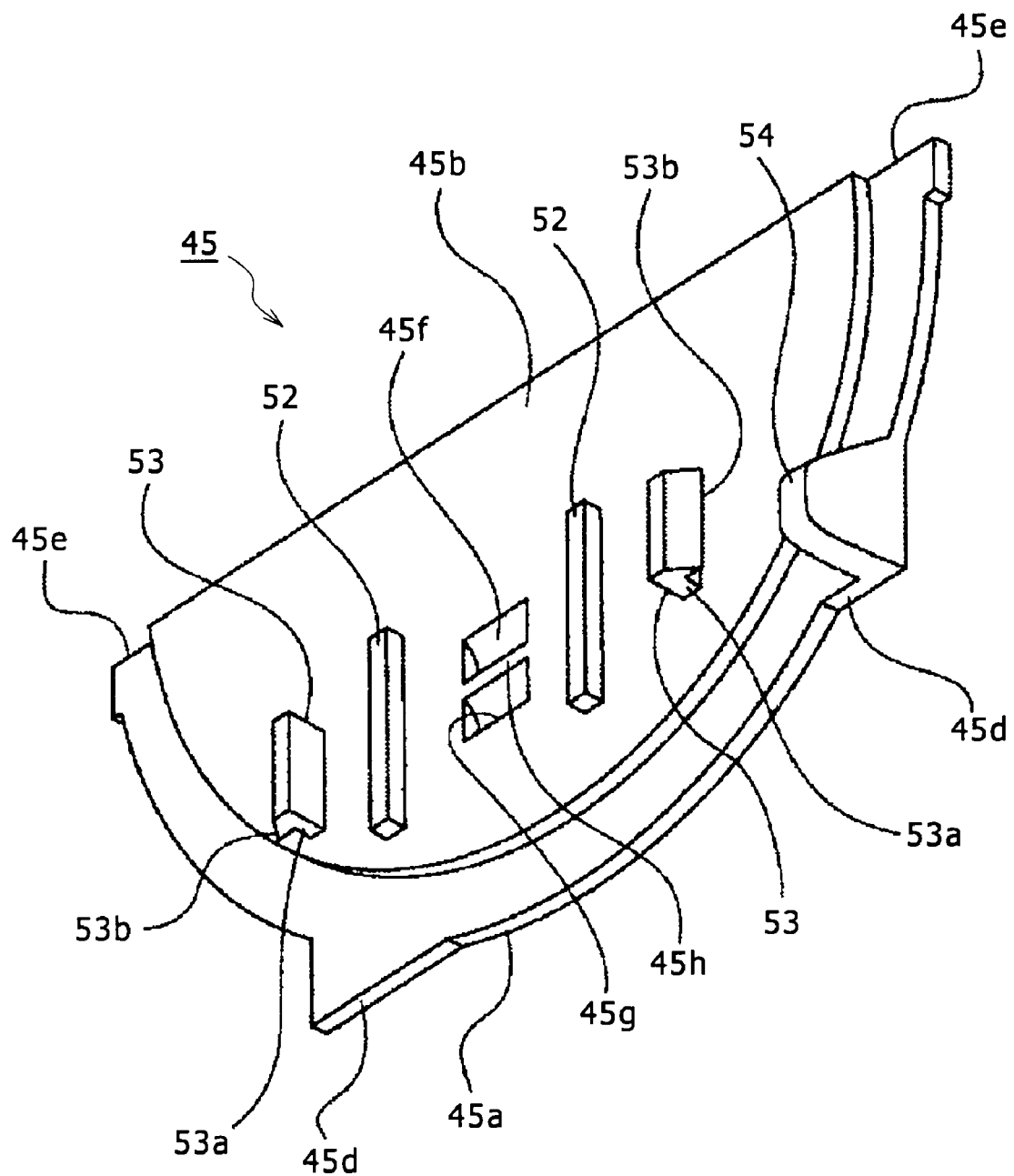
FIG. 13 is an enlarged perspective view of an operating section of the first operation unit.

As shown in FIG. 13, the operating section 45 is provided in its front surface with held groove 45f and 45g in a central area in the left-right direction. The held grooves 45f and 45g are formed as shallow recessed grooves which are vertically spaced from each other, and a portion between the held grooves 45f and 45g is provided as a partition portion 45h extending in the left-right direction.

On the front surface of the operating section 45, vertically extending guided projected portions 52, 52 are provided on the left and right sides of the held grooves 45f and 45g in a forwardly projected form, and supported projected portions 53, 53 are provided respectively on the outer side of the guided projected portions 52, 52. The supported projected portions 53, 53 are composed of connecting portions 53a, 53a projected forwards, and engaging projected portions 53b, 53b projected outwards from front end portions of the connecting portions 53a, 53a, respectively.

On the front surface of the operating section 45, an operating projected portion 54 projected forwards is provided at a near-right-end position of a peripheral edge.

The click spring 46 includes, as one body, a spring portion 55 extending vertically, base portions 56, 56 which are respectively continuous with the upper end and the lower end of the spring portion 55, and connecting wire portions 57, 57 located respectively on the left and right sides of the spring portion 55.

The spring portion 55 is so shaped that its width in the left-right direction decreases from its upper and lower ends toward its center, and is provided with a click projected portion 55a at its central portion in the vertical direction. The click projected portion 55a is formed in a substantially hemispherical shape protuberant to the rear side.

The connecting wire portions 57, 57 are so provided as to respectively connect left end portions and right end portions of the base portions 56, 56 to each other.

The click spring 46 is elastically deformable so that the spring portion 55 is displaced in the front-rear direction relative to the base portions 56, 56.

The click spring 46 is inserted and disposed in the arranging recess 48 of the support base 44.

In the condition where the click spring 46 is disposed in the arranging recess 48, the supported projected portions 53, 53 of the operating section 45 are respectively inserted in the support holes 50, 50 in the support base 44 from the rear side. When the supported projected portions 53, 53 are respectively inserted into the support holes 50, 50, the engaging projected portions 53b, 53b of the supported projected portions 53, 53 are elastically deformed while sliding on wall surfaces defining the support holes 50, 50, respectively. As the supported projected portions 53, 53 are respectively inserted further into the support holes 50, 50, the engaged projected portions 53b, 53b are elastically returned upon respectively reaching front-side opening edges of the support holes 50, 50 to be engaged with the front-side engaging edges, whereby the operating section 45 is slidably supported on the support base 44.

In the condition where the operating section 45 is slidably supported on the support base 44, the guided projected portions 52, 52 are slidably supported respectively in the guide grooves 49, 49, and the operating projected portion 54 is inserted in the projected-portion insertion hole 51. Besides, in the condition where the operating section 45 is slidably supported on the support base 44, the click projected portion 55a of the click spring 46 is inserted in and engaged with one of the held grooves 45f and 45g of the operating section 45.

As shown in FIG. 4, the second operation unit 43 is mounted to the metallic casing body 3 and the like by the mounting screws 100, 100 passed respectively through the screw insertion holes 44a, 44a of the support base 44. Specifically, the mounting screw 100 on one side is passed through the screw insertion hole 32a in the circuit board 31 and through the screwing piece 22a of the chassis 21 and is screw-engaged with the screwing piece 6c of the metallic casing body 3. In addition, the mounting screw 100 on the other side is passed through the screw insertion hole 32a in the circuit board 31 and is screw-engaged with the screwing portion 29c of the holding member 29 in the earphone unit 27. Therefore, the mounting screws 100, 100 are respectively screw-engaged with the screwing piece 6c of the metallic casing body 3 and the screwing portion 29c of the earphone unit 27, whereby the second operation unit 43 is mounted to the metallic casing body 3 and the earphone unit 27.

Incidentally, the mounting screw 100 on the one side is the mounting screw 100 which is passed through the screw insertion hole 32a in the circuit board 31 and through the screwing piece 22a of the chassis 21 and is screw-engaged with the screwing piece 6c of the metallic casing body 3. Therefore, the second operation unit 43 and the circuit board 31 and the chassis 21 are co-fastened to the metallic casing body 31 by the mounting screw 100 on the one side. In addition, the mounting screw 100 on the other side is the mounting screw 100 which is passed through the screw insertion hole 32a in the circuit board 31 and is screw-engaged with the screwing portion 29c of the earphone unit 27. Therefore, the second operation unit 43 and the circuit board 31 are co-fastened to the earphone unit 27 by the mounting screw 100 on the other side.

In the condition where the second operation unit 43 is mounted to the metallic casing body 3 and the like, the antenna 42 mounted on the circuit board 31 is covered with the second operation unit 43 on the rear side, and the antenna 42 is covered on the left and right side by the cover walls 44e, 44e provided in the support base 44.

[Rear Panel]

The rear panel 5 is formed from a resin material. The rear panel 5 is formed at its upper end portion with a cutout portion 5a opening to the upper side, and the cutout portion 5a is formed in a substantially semicircular shape protuberant to the lower side (see FIGS. 3 and 4).

On the front surface of the rear panel 5, connecting portions 58 and 59 formed from a resin material are provided in an upper end portion in the state of being spaced from each other in the left-right direction.

The connecting portion 58 located on the right side is composed of a connecting surface portion 58a formed in a rectangular shape elongated in the vertical direction, and an engaging piece portion 58b projected upward from a front end portion of an upper surface of the connecting surface portion 58a. The connecting portion 58 is mounted to the front side of the rear panel 5 at its connecting surface portion 58a.

The connecting portion 59 located on the left side is composed of a connecting surface portion 59a oriented in the front-rear direction, and an engaging piece portion 59b continuous with a left side edge of the connecting surface portion 59a. The engaging piece portion 59b is formed in a plate-like shape oriented in the left-right direction, and its lower half is continuous with a left side edge of the connecting surface portion 59a. The connecting portion 59 is mounted to the front surface of the rear panel 5 at its connecting surface portion 59a.

To the front surface of the rear panel 5, a metallic reinforcement plate 60 for enhancing rigidity of the rear panel 5 is mounted in a lower end portion. The reinforcement plate 60 has a mounted surface portion 60a mounted to the front surface of the rear panel 5, and screwing piece portions 60b, 60b projected forwards from a lower edge of the mounted surface portion 60a. The screwing piece portions 60b, 60b are spaced from each other in the left-right direction.

The rear panel 5 is mounted to the metallic casing body 3 and the like in the following manner.

Figure 14:
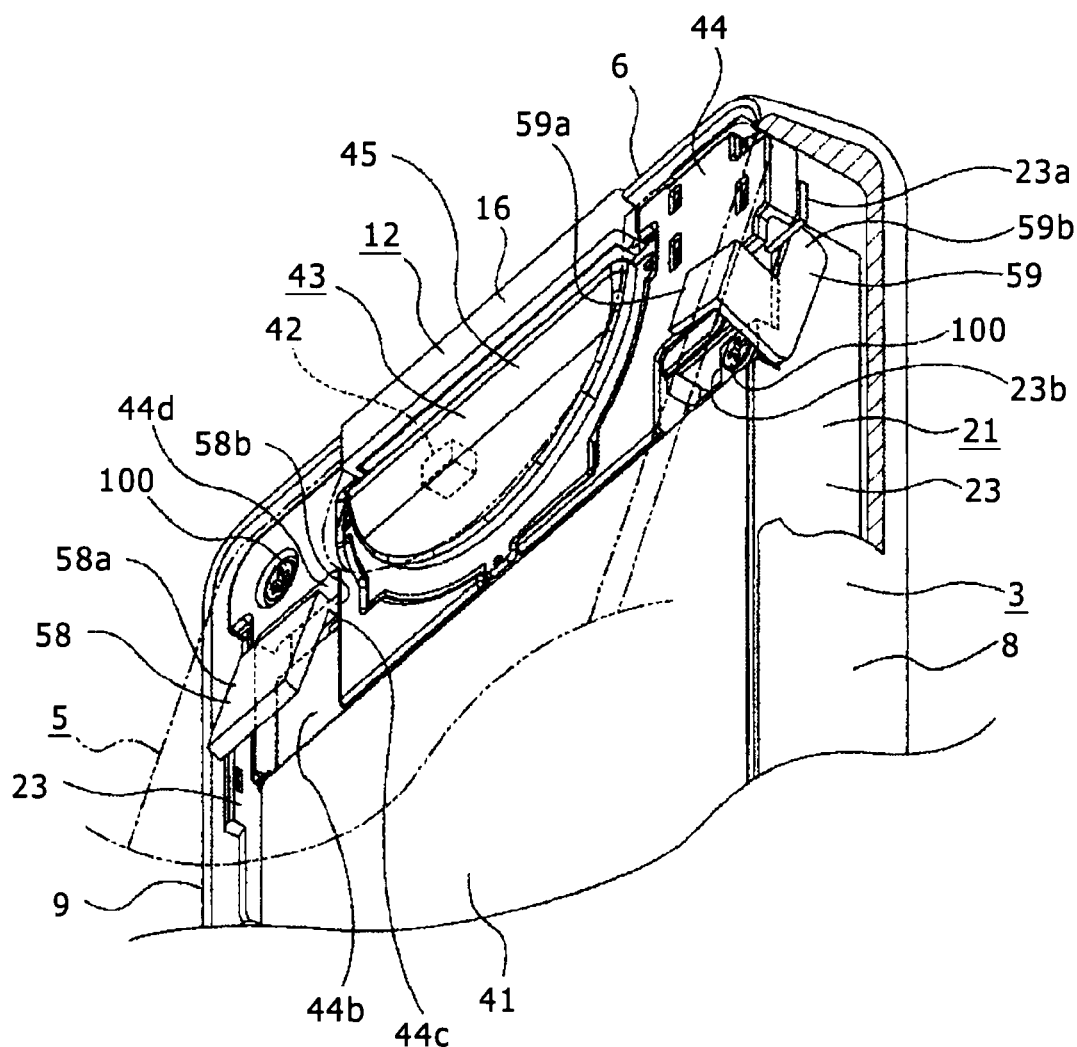
FIG. 14 is an enlarged perspective view showing, partly in section, a condition where a connecting section provided on a rear panel is engaged with a support base of the second operation unit and an engaging piece of the chassis.

First, as shown in FIG. 14, the connecting portion 58 is slid upward in the state of being inserted in the engaging recess 44b formed in the support base 44 of the second operation unit 43, and the rear surface of the engaging piece portion 58b is engaged with the front surface of the engaging portion 44d. Simultaneously, a rear edge of the engaging piece portion 59b of the connecting portion 59 is engaged with the front surface of the engaging piece 23a provided at the side surface portion 23 of the chassis 21.

Figure 15:
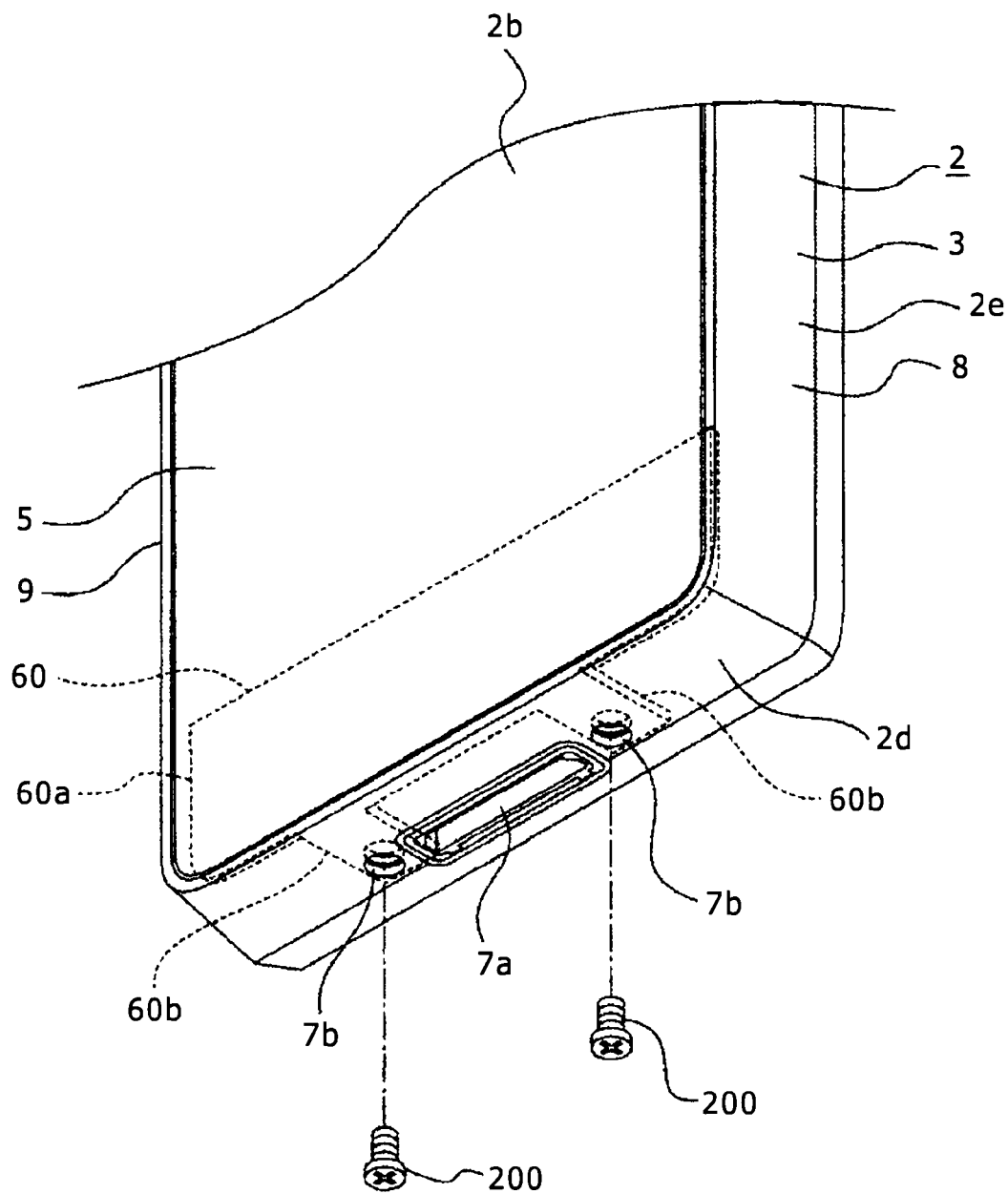
FIG. 15 is an enlarged perspective view showing a condition where screwing pieces of a reinforcement plate are in contact with an upper surface of a lower surface portion of the metallic casing.

Next, the screwing piece portions 60b, 60b of the reinforcement plate 60 are brought into contact with an upper surface of the lower surface portion 7 of the metallic casing body 3, as shown in FIG. 15, and screw members 200, 200 are respectively passed through screw insertion holes 7b, 7b formed in the lower surface portion 7 and are screw-engaged with the screwing piece portions 60b, 60b.

With the screw members 200, 200 screw-engaged with the screwing piece portions 60b, 60b, the rear panel 5 is mounted to the second operation unit 43, the chassis 21 and the metallic casing body 3.

In the condition where the rear panel 5 is mounted to the metallic casing body 3 and the like, the operating section 45 of the second operation unit 43 is disposed in the cutout portion 5a of the rear panel 5.

Figure 16:
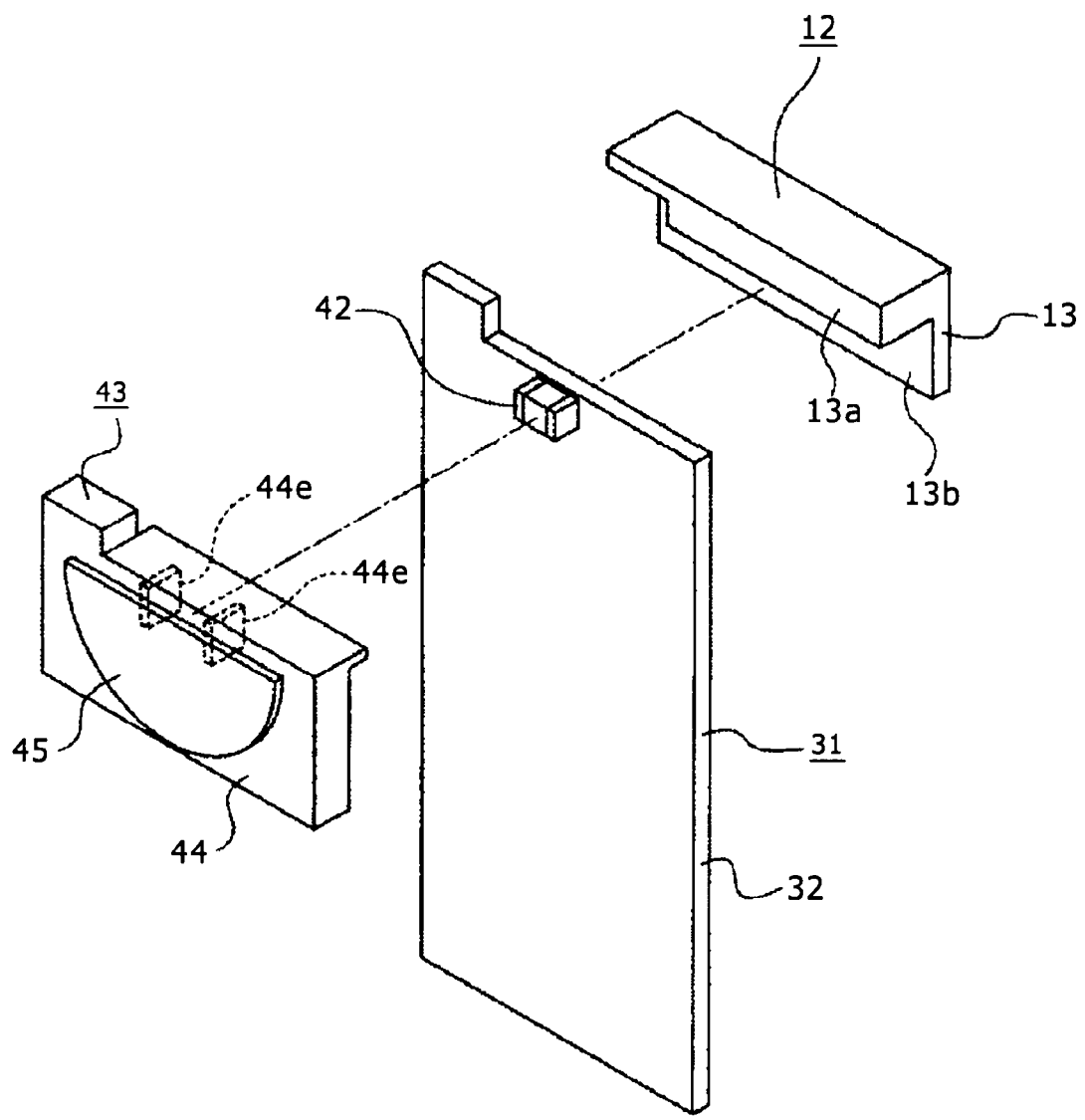
FIG. 16 is a conceptual illustration of a condition where an antenna is covered with portions each formed from a resin material.

With the rear panel 5 mounted to the metallic casing body 3 and the like as above-mentioned, the portable terminal device 1 is configured. In the condition where the portable terminal device 1 is thus configured, as shown in FIG. 16, the mounted surface portion 13b of the base body 13 which portion is formed from a resin material is located on the front side of the antenna 42, and the adhering surface portion 13a of the base body 13 which portion is formed from a resin material is located on the upper side of the antenna 42. In addition, the support base 44 formed from a resin material of the second operation unit 43 is located on the rear side of the antenna 42, and the cover walls 44e, 44e of the support base 44 which are formed from a resin material are located respectively on the left and right sides of the antenna 42. Therefore, the antenna 42 is covered with the resin material-formed portions on the five directions other than the lower side.

[Operations of Portable Terminal Device]

In the condition where the portable terminal device 1 is configured as above-mentioned, a power supply is turned on and the touch panel section 4a of the front panel 4 is operated by a finger or a stylus pen, whereby execution of a desired function or functions can be effected. Specifically, by operations on the touch panel section 4a, it is possible to effect execution of various functions other than the holding function for holding a condition where execution of various functions can be effected or a condition where execution of various functions cannot be effected.

In addition, by slidingly operating the operating section 45 functioning as a holding knob, it is possible to effect the holding function for holding a condition where execution of various functions can be effected or a condition where execution of various functions cannot be effected.

Now, operations of the operating section 45 will be described below.

Figure 17:
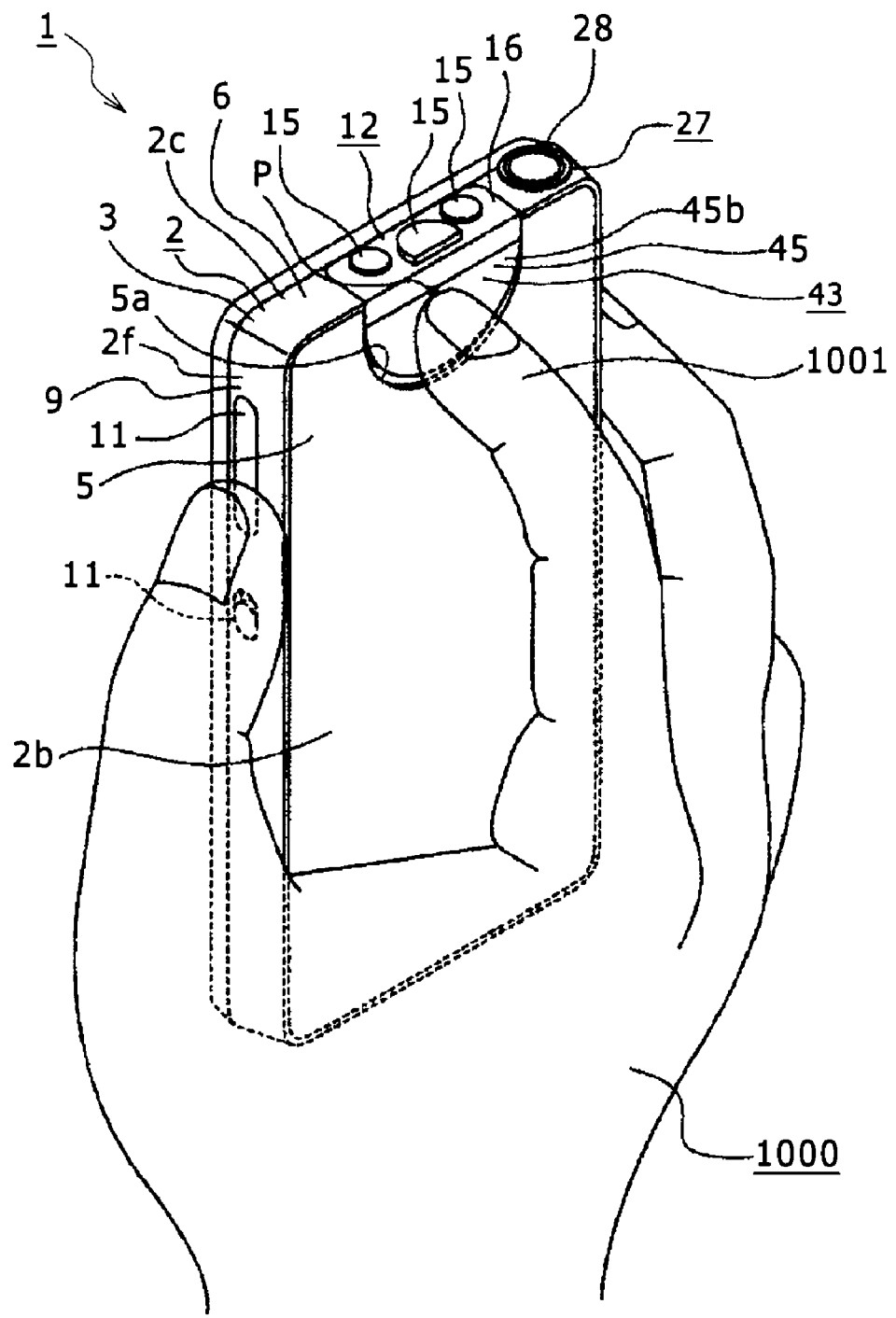
FIG. 17 is a perspective view showing a condition where the portable terminal device is gripped by one hand and the operating section disposed at a rear surface of the casing is being operated.
Figure 18:
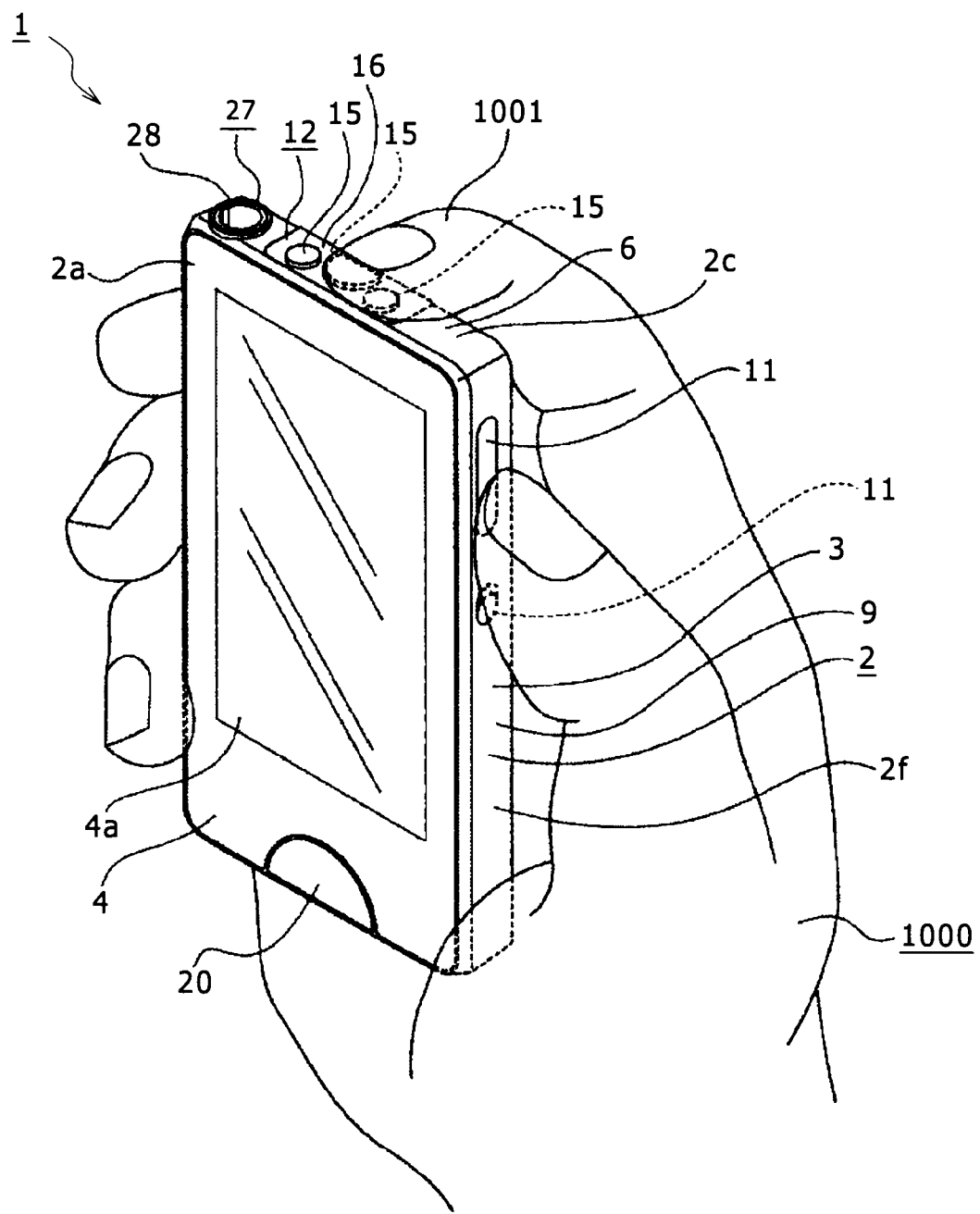
FIG. 18 is a perspective view showing a condition where the portable terminal device is gripped by one hand and operating means disposed at an upper surface of the casing is being operated.

Since the portable terminal device 1 is a device designed to be carried, in general, it is often used in the state of being gripped by one hand. For instance, when the portable terminal device 1 is used by gripping it with one hand 1000, as shown in FIGS. 17 and 18, the user often uses it in such an orientation that the display panel 24 faces toward the user's side. In this instance, the user's index finger 1001 is put on the rear surface 2*b* or the top surface 2*c* of the casing 2.

Therefore, with the operating section 45 of the second operation unit 43 disposed at the rear surface 2*b* of the casing 2 in the portable terminal device 1, the operating section 45 can be easily operated by the index finger 1001 in the condition where the display panel 24 faces toward the user. Thus, an enhanced operability is promised.

Also, with operating means 15, 15, 15 of the first operation unit 12 disposed at the top surface 2*c* of the casing 2, the operating means 15, 15, 15 can be easily operated by the index finger 1001 in the condition where the display panel 24 faces toward the user. Thus, an enhanced operability is promised.

Furthermore, since the operating section 45 is formed in a substantially semicircular shape, the force exerted on the operating section 45 from the finger at the time of a sliding operation is liable to act along the direction of line of connection between a central portion P of the semicircular shape and the finger, so that the operating section 45 can be operated smoothly.

Figure 19:
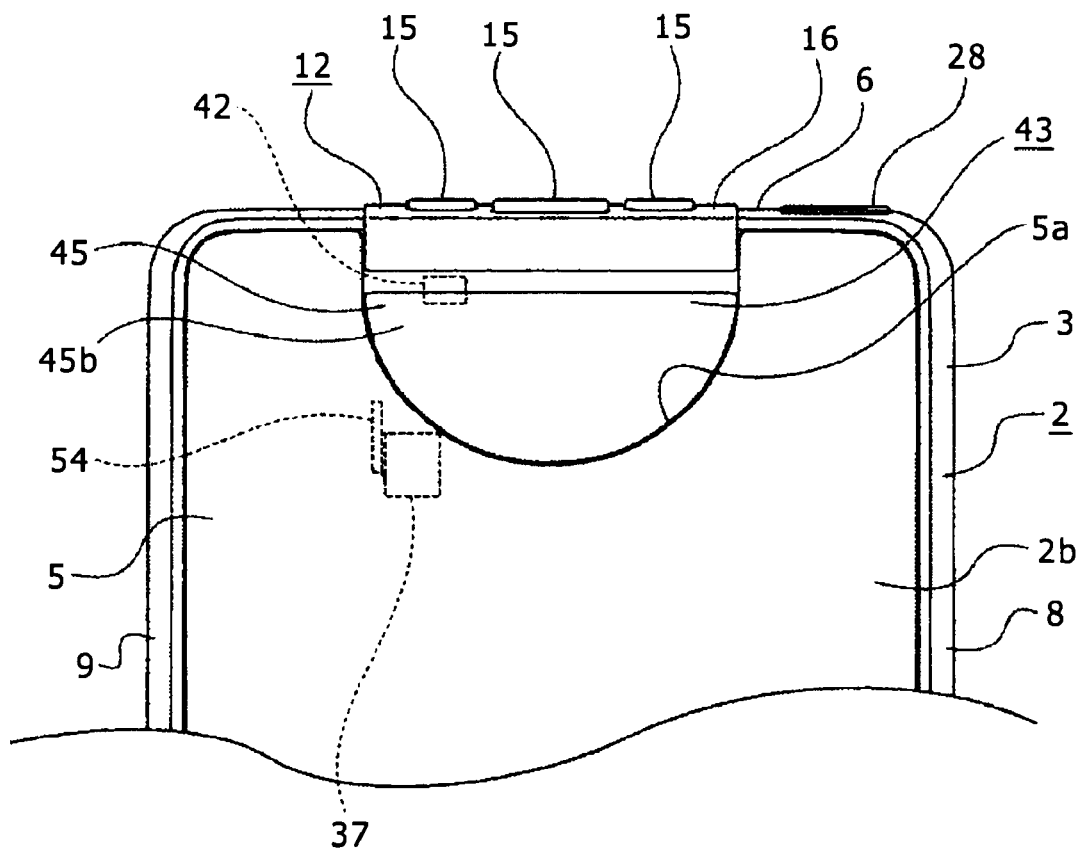
FIG. 19 is an enlarged rear view showing, together with switches, a condition where the operating section is held in a first operating position.
Figure 20:
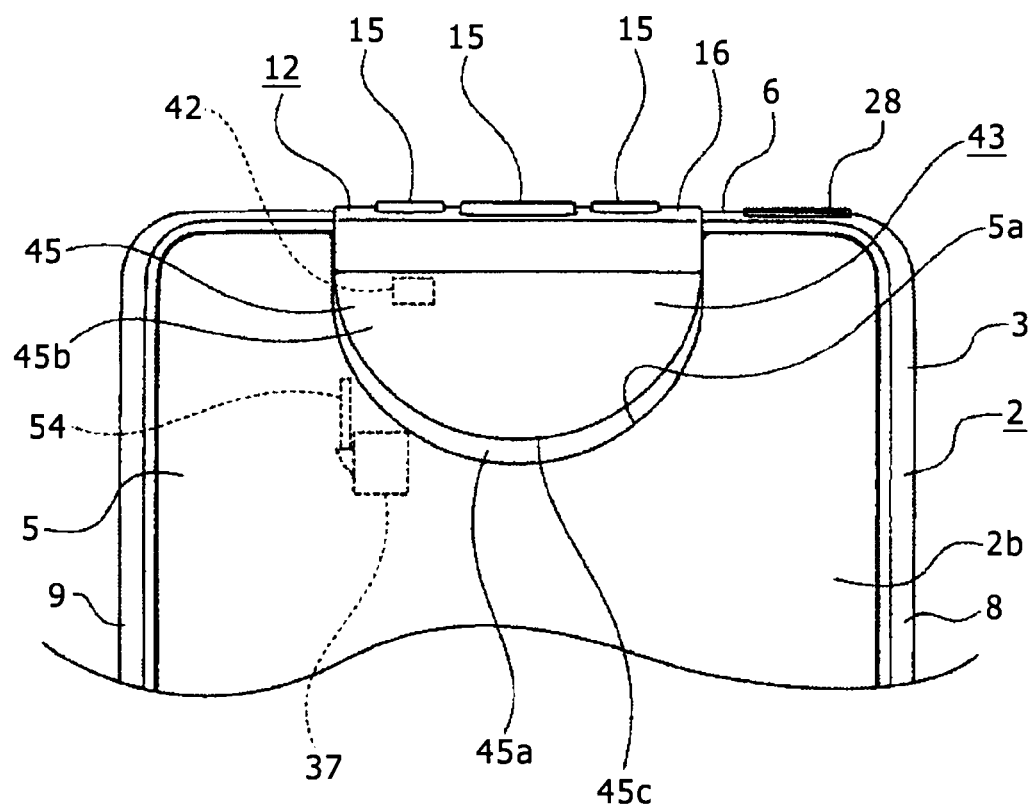
FIG. 20 is an enlarged rear view showing, together with the switches, a condition where the operating section is held in a second operating position.

The operating section 45 is slid between a first operating position which is a lower-side end of movement (see FIG. 19) and a second operating position which is an upper-side end of movement (see FIG. 20). In the condition where the operating section 45 is in the first operating position, the switch 37 mounted on the circuit board 31 is being operated by the operating projected portion 54 of the operating section 45, whereby a condition where execution of various functions cannot be effected is held (see FIG. 19).

Figure 21:
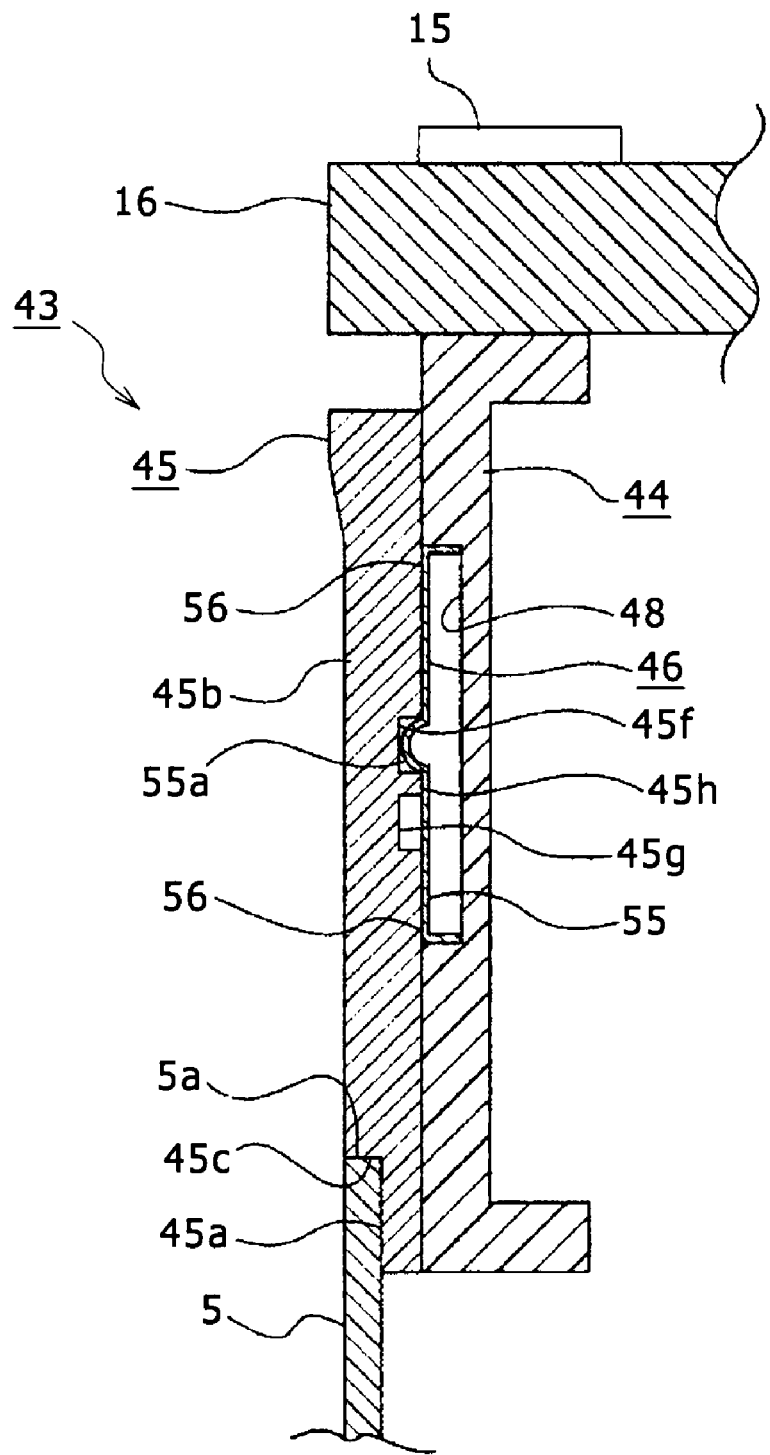
FIG. 21 is an enlarged sectional view showing a condition where the operating section is held in the first operating position and a click projected portion of a click spring is engaged with a held groove of the operating section.

In the first operating position, the operating section 45 is in an engaged condition in which the click projected portion 55*a* of the clip spring 46 is inserted in the held groove 45*f* on the upper side (see FIG. 21). In this instance, the operating section 45 is restrained from downward slide and held in the first operating position, since its first restricted edges 45*d*, 45*d* are respectively engaged with the first stopper edges 47*a*, 47*a* of the support base 44, as shown in FIG. 19.

Figure 22:
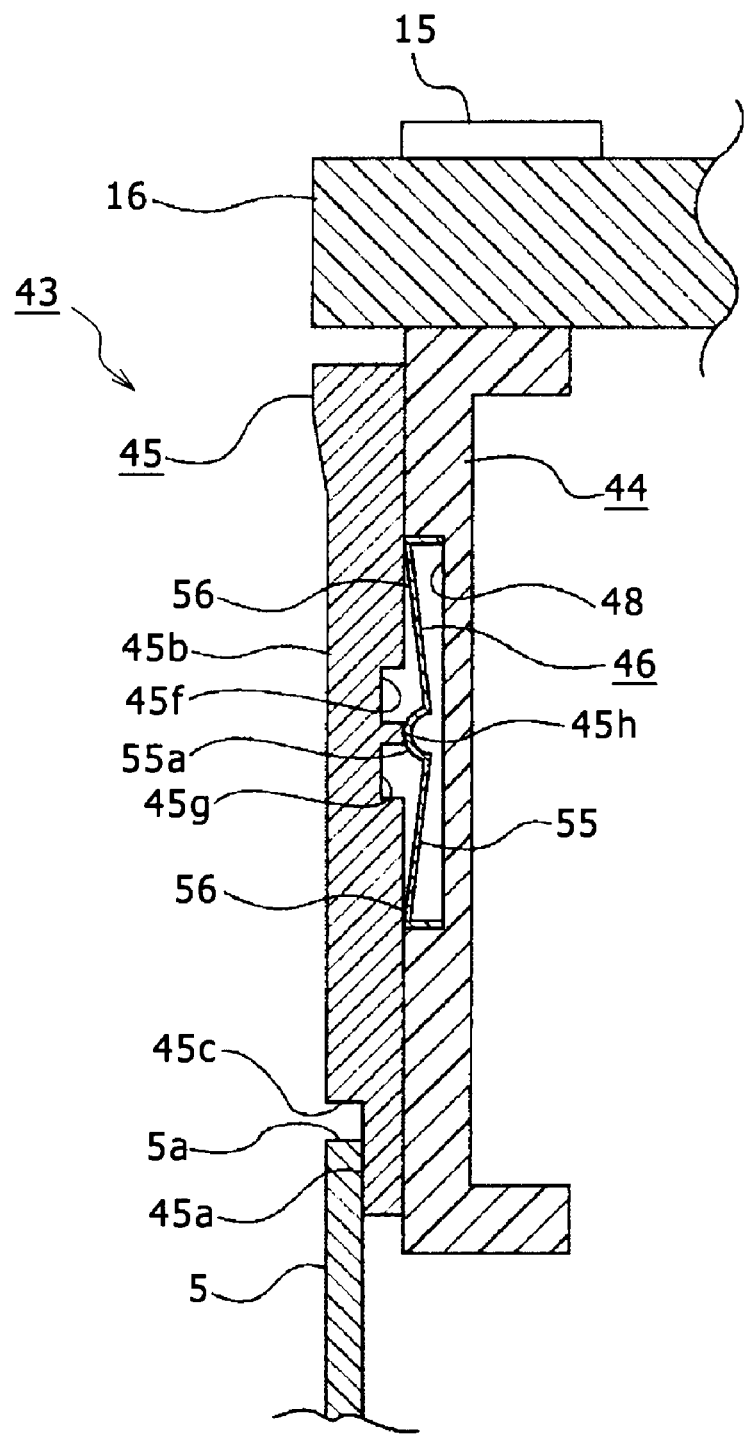
FIG. 22 is an enlarged sectional view showing a condition where the operating section has been slid to cause the click projected portion of the click spring to ride onto a partition portion and a spring portion is in a bent form.

When the operating section 45 is operated to slide upward from the first operating position, the engagement of the click projected portion 55*a* with the held groove 45*f* is released, and the click projected portion 55*a* is caused to ride onto and is engaged with the partition wall 45*h* (see FIG. 22). During this process, the spring portion 55 of the click spring 46 is elastically deformed and the click projected portion 55*a* is displaced downward.

Figure 23:
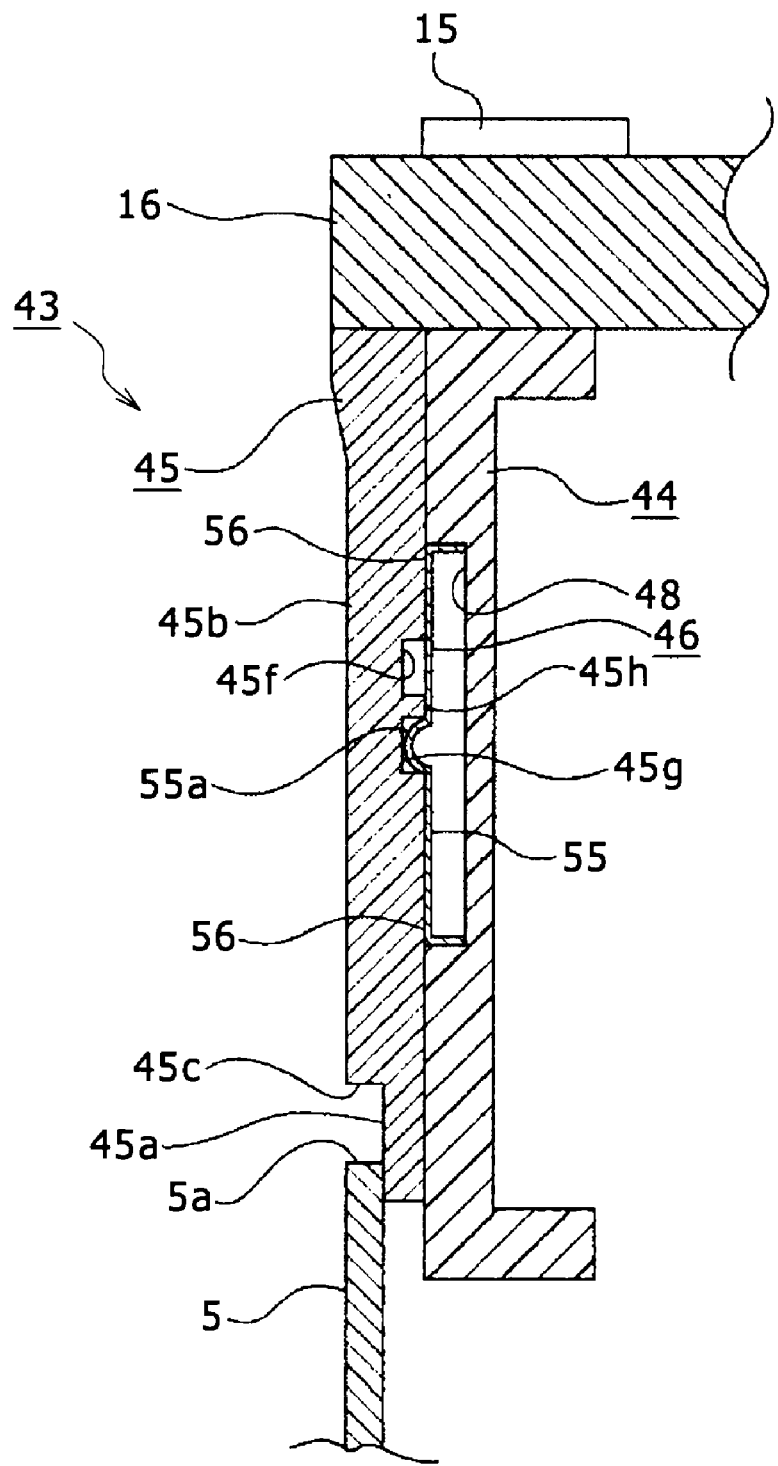
FIG. 23 is an enlarged sectional view showing a condition where the operating section is held in the second operating position and the click projected portion of the click spring is engaged with a held groove of the operating section.

When the operating section 45 is further operated to slide upward, the engagement of the click projected portion 55*a* with the partition portion 45*h* is released, and the click projected portion 55*a* is inserted into and engaged with the held groove 45*g* on the lower side (see FIG. 23). In this instance, the operating section 45 is restrained from upward slide and held in the second operating position, since its second restricted edges 45*e*, 45*e* are respectively engaged with the second stopper edges 47*b*, 47*b* of the support base 44, as shown in FIG. 20. In the condition where the operating section 45 is held in the second operating position, the operation on the switch 37 mounted on the circuit board 31 by the operating projected portion 54 of the operating section 45 has been released, so that a condition where execution of various functions can be effected is held (see FIG. 20).

When the operating section 45 is operated to slide downwards from the second operating position, on the contrary, the engagement of the click projected portion 55*a* with the held groove 45*g* is released, and the click projected portion 55*a* is caused to ride onto and is engaged with the partition wall 45*h* (see FIG. 22). During this process, the spring portion 55 of the click spring 46 is elastically deformed and the click projected portion 55*a* is displaced downwards.

When the operating section 45 is further operated to slide downwards, the engagement of the click projected portion 55*a* with the partition portion 45*h* is released, and the click projected portion 55*a* is inserted into and engaged with the held groove 45*f* on the upper side (see FIG. 21). In this instance, the operating section 45 is restrained from downward slide and held in the first operating position, since its first restricted edges 45*d*, 45*d* are respectively engaged with the first stopper edge 47*a*, 47*a* of the support base 44, as shown in FIG. 19. When the operating section 45 is thus held again in the first operating position, the switch 37 mounted on the circuit board 31 is again operated by the operating projected portion 54 of the operating section 45, whereby a condition where execution of various functions cannot be effected is held (see FIG. 19).

As above-mentioned, the second operation unit 43 is provided with the click spring 46 for holding the operating section 45 in the first operating position or the second operating position. Therefore, operability is enhanced and, hence, enhanced convenience in use of the portable terminal device 1 is promised.

In addition, the click spring 46 enables the operating section 45 to be securely held in the first operating position or the second operating position. This ensures that a function corresponding to an operation intended by the user can be assuredly executed.

Further, since the click spring 46 is formed from a resin material, the arrangement of the click spring 46 would not cause a lowering in the sensitivity of the antenna 42, so that good communication performance can be secured.

Figure 24:
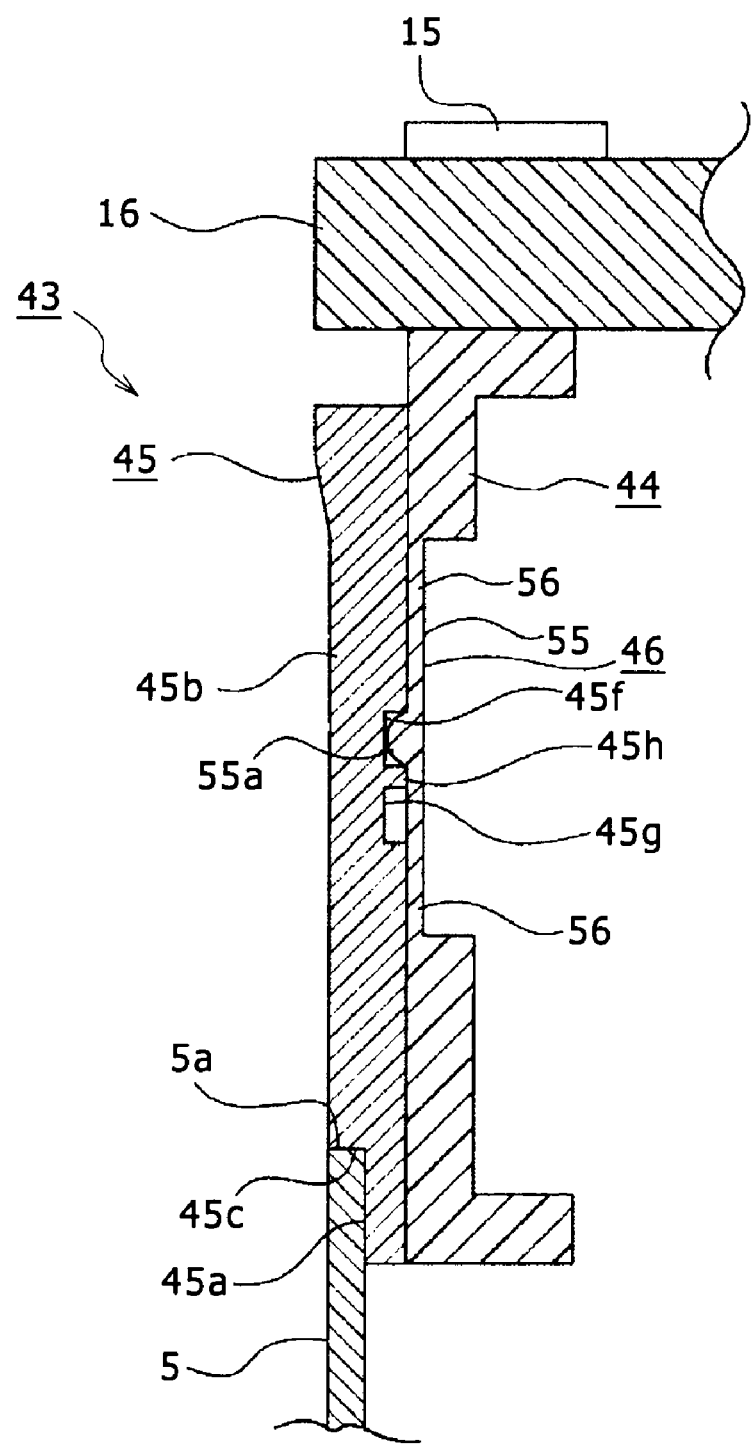
FIG. 24 is an enlarged sectional view showing an example in which the click spring is formed as one body with the operating section.

Incidentally, while an example in which the click spring 46 is provided as a component part separate from the support base 44 has been shown in the above description, it is possible to adopt a configuration in which the click spring 46 is formed as one body with the support base 44, as shown in FIG. 24.

With the click spring 46 formed as one body with the support base 44, it is possible to contrive a reduction in the number of component parts and, hence, a lowering in the manufacturing cost of the portable terminal device 1.

Incidentally, in the portable terminal device 1, a plurality of operating means 11, 11 and operating means 15, 15, 15 are arranged at such positions as to block the antenna 42. Therefore, the operating means 11, 11 and operating means 15, 15, 15 are collectively arranged in the vicinity of the operating section 45, which promises an enhanced operability.

In addition, where a replay button, which is considered to be used frequently, is arranged as the operating means 15, a further enhanced operability is promised.

As has been described above, in the portable terminal device 1, at least part of the casing 2 is composed of the metallic casing 3 which is high in rigidity, while the second operation unit 43 formed from a resin material and having the operating section 45 is arranged at such a position as to block the antenna 42.

Therefore, it is possible to realize an enhanced communication performance while securing sufficient rigidity of the casing 2.

While an example in which a holding knob is provided primarily as the operating section 45 has been shown in the above description, the operating section 45 is not limited to the holding knob; for example, a home button (home knob) or any other operating means provided in a portable terminal device 1 may also be used as the operating section 45.

All the specific shapes and structures of the portions shown in the above-described best mode for carrying out the present invention are merely examples of embodying the invention, and, therefore, the technical scope of the invention is not to be construed as limited to or by the examples.

The present application contains subject matter related to that disclosed in Japanese Priority Patent Application JP 2008-308971 filed in the Japan Patent Office on Dec. 3, 2008, the entire content of which is hereby incorporated by reference.

What is claimed is:

1. A portable terminal device comprising:
   an antenna;
   a casing at least part of which is formed from a metallic material, the casing disposed so that the antenna is exposed; and
   an operation unit formed from a resin material, the operation unit mounted to the casing so as to entirely cover the antenna, the operation unit including a holding knob that is operated by sliding, and that holds a first operating position in which a plurality of content playback related functions specifying replay, fast forward, and reverse operations on content are not executable, the plurality of content playback related functions being respectively implemented by a replay button, a fast forward button, and a reverse button disposed at a top surface of the casing, wherein
   the holding knob is provided on an opposite surface, of the casing, from a predetermined surface where a display panel is disposed.

2. The portable terminal device according to claim 1, wherein the display panel displays an image when the holding knob is in a second operating position.

3. The portable terminal device according to claim 1, wherein a support base slidably supports the operating unit, and that is provided as part of the operation unit, the operating unit is slidable relative to the support base between the first operating position and a second operating position, and the operation unit has a click spring that selectively holds the operating unit in the first operating position or the second operating position, the click spring formed from a resin material.

4. The portable terminal device according to claim 3, wherein the click spring is formed as one body with the support base.

5. The portable terminal device according to claim 1, wherein the operating unit is formed in a substantially semicircular shape.

6. The portable terminal device according to claim 1, wherein the operating unit has a peripheral portion, that is exclusive of an upper end portion, and that is thinner than a portion formed of a thick portion and a stepped portion.

7. The portable terminal device according to claim 6, wherein the stepped portion extends in an arcuate shape and is formed in a boundary area between the peripheral portion and the thick portion.

8. The portable terminal device according to claim 1, wherein the holding knob further holds a second operating position, by another sliding operation, in which the plurality of content playback related functions are executable.

9. The portable terminal device according to claim 1, wherein the operating unit has a semicircular shape.

* * * * *